(12) United States Patent
Hwang et al.

(10) Patent No.: US 7,663,990 B2
(45) Date of Patent: Feb. 16, 2010

(54) OPTICAL RECORDING MEDIUM HAVING ACCESS CONTROL AREA AND METHOD FOR RECORDING OR REPRODUCING THEREOF

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1021 days.

(21) Appl. No.: 11/062,669

(22) Filed: Feb. 23, 2005

(65) Prior Publication Data

US 2005/0270965 A1  Dec. 8, 2005

(30) Foreign Application Priority Data

May 21, 2004  (KR) ............... 10-2004-0036377
Jun. 10, 2004  (KR) ............... 10-2004-0042656

(51) Int. Cl.
*G11B 5/09* (2006.01)

(52) U.S. Cl. ............... 369/47.14; 369/53.17

(58) Field of Classification Search ............ 369/53.17, 369/47.14, 53.2, 53.21, 53.22, 53.41, 47.11; 714/710

See application file for complete search history.

(56) References Cited

U.S. PATENT DOCUMENTS

| | | | | |
|---|---|---|---|---|
| 5,233,576 A * | 8/1993 | Curtis et al. | ............ | 369/13.02 |
| 5,687,397 A | 11/1997 | Ohmori | | |
| 5,737,639 A | 4/1998 | Ohmori | | |
| 5,761,188 A | 6/1998 | Rosen et al. | | |
| 5,825,726 A | 10/1998 | Hwang et al. | | |
| 5,914,917 A | 6/1999 | Bae | | |
| 5,978,812 A | 11/1999 | Inokuchi et al. | | |
| 6,038,208 A | 3/2000 | Shikunami et al. | | |
| 6,122,436 A | 9/2000 | Okada et al. | | |
| 6,128,263 A | 10/2000 | Sawada et al. | | |
| 6,137,769 A * | 10/2000 | Sawada et al. | ............ | 369/275.3 |
| 6,160,778 A * | 12/2000 | Ito et al. | ............ | 369/53.15 |
| 6,160,952 A | 12/2000 | Mimura et al. | | |
| 6,243,343 B1 | 6/2001 | Ishimura et al. | | |
| 6,330,210 B1 * | 12/2001 | Weirauch et al. | ......... | 369/30.11 |

(Continued)

FOREIGN PATENT DOCUMENTS

CN  1167313  12/1997

(Continued)

OTHER PUBLICATIONS

Office Action issued in Korean Patent Application No. 2004-42656 on Dec. 16, 2005.

(Continued)

*Primary Examiner*—Tan X Dinh
(74) *Attorney, Agent, or Firm*—Stein McEwen, LLP

(57) ABSTRACT

An information recording medium includes an access control area in which access control data (ACD) is recorded, the ACD having common information set to allow a recording/reproducing apparatus that cannot recognize a predetermined function of the information recording medium to control access to the information recording medium; and an ACD state information area in which state information regarding one of defectiveness and recordability of an ACD block, at which the ACD is recorded in the access control area, is recorded.

12 Claims, 19 Drawing Sheets

U.S. PATENT DOCUMENTS

| | | |
|---|---|---|
| 6,424,615 B1 | 7/2002 | Ishimura et al. |
| 6,459,666 B1 | 10/2002 | Yokoi |
| 6,469,963 B1 | 10/2002 | Sawada et al. |
| 6,580,682 B1 * | 6/2003 | Kamperman et al. ..... 369/275.3 |
| 6,580,684 B2 | 6/2003 | Miyake et al. |
| 6,646,965 B1 | 11/2003 | Kim |
| 6,671,249 B2 | 12/2003 | Horie |
| 6,678,236 B1 | 1/2004 | Ueki |
| 6,785,196 B2 | 8/2004 | Bakx et al. |
| 6,934,236 B2 * | 8/2005 | Lee et al. ............... 369/59.11 |
| 7,009,926 B2 * | 3/2006 | Lee ..................... 369/59.11 |
| 7,173,891 B2 * | 2/2007 | Lee et al. ............... 369/47.27 |
| 7,193,959 B2 * | 3/2007 | Lee et al. ............... 369/275.3 |
| 7,369,475 B2 * | 5/2008 | Nagai ................... 369/53.27 |
| 7,433,287 B2 * | 10/2008 | Lee ..................... 369/59.11 |
| 2001/0048659 A1 | 12/2001 | Weirauch et al. |
| 2002/0006084 A1 | 1/2002 | Kawashima et al. |
| 2002/0181376 A1 | 12/2002 | Acker |
| 2003/0012088 A1 | 1/2003 | Bakx et al. |
| 2003/0063540 A1 | 4/2003 | Kato et al. |
| 2003/0067859 A1 | 4/2003 | Weijenbergh et al. |
| 2003/0086345 A1 | 5/2003 | Ueki |
| 2003/0090981 A1 | 5/2003 | Yokoi |
| 2003/0223339 A1 | 12/2003 | Taniguchi et al. |
| 2004/0071068 A1 | 4/2004 | Lee et al. |
| 2004/0105322 A1 | 6/2004 | Lee et al. |
| 2004/0125723 A1 | 7/2004 | Lee et al. |
| 2005/0038957 A1 * | 2/2005 | Suh ..................... 711/112 |
| 2005/0207320 A1 * | 9/2005 | Park .................... 369/124.07 |
| 2005/0254379 A1 * | 11/2005 | Hwang .................. 369/53.2 |
| 2008/0094969 A1 * | 4/2008 | Hwang .................. 369/47.15 |

FOREIGN PATENT DOCUMENTS

| | | |
|---|---|---|
| CN | 1168182 | 12/1997 |
| JP | 2-278439 | 11/1990 |
| JP | 8-328933 | 12/1996 |
| JP | 2001-126407 | 5/2001 |
| JP | 2004-005772 | 1/2004 |
| KR | 2004-12392 | 2/2004 |
| TW | 200405273 A | 4/2004 |
| TW | 200421323 A | 10/2004 |
| TW | 200426793 A | 12/2004 |

OTHER PUBLICATIONS

DRX-510 UL, High Performance External Dual RW DVD/CD Recording for Microsoft Windows Operating Systems (Sony Electronics Inc. 2003).

DRU-510A High Performance Dual RW DVD/CD Recorder for Microsoft Windows 98SE, Windows Millennium Edition, Windows 2000, and Windows XP Operating Systems (Sony Electronics Inc. 2003).

U.S. Appl. No. 11/062,808, filed Feb. 23, 2005, Sung-hee Hwang, Samsung Electronics Co., Ltd.

U.S. Appl. No. 12/027,353, filed Feb. 7, 2008, Sung-hee Hwang et al., Samsung Electronics Co., Ltd.

U.S. Appl. No. 12/027,452, filed Feb. 7, 2008, Sung-hee Hwang et al., Samsung Electronics Co., Ltd.

U.S. Appl. No. 12/027,486, filed Feb. 7, 2008, Sung-hee Hwang et al., Samsung Electronics Co., Ltd.

Office Action issued in corresponding Chinese Patent Application No. 2005100710213 dated Jan. 4, 2008.

Search/Examination Report issued by the Austrian Patent Office Service and Information Center in Singapore Patent Application No. 200502989-7 on Sep. 29, 2006.

Office Action issued in Taiwan Patent Application No. 94115859 on Jul. 31, 2009.

* cited by examiner

OPTICAL RECORDING MEDIUM HAVING ACCESS CONTROL AREA AND METHOD FOR RECORDING OR REPRODUCING THEREOF

CROSS-REFERENCE TO RELATED APPLICATIONS

This application claims the benefit of Korean Patent Application No. 10-2004-0036377, filed on May 21, 2004 in the Korean Intellectual Property Office, and Korean Patent Application No. 10-2004-0042656, filed on Jun. 10, 2004 in the Korean Intellectual Property Office, the disclosures of which are incorporated herein in their entireties by reference.

BACKGROUND OF THE INVENTION

1. Field of the Invention

The present invention relates to a disc, and more particularly, to an information recording medium, a write-once information recording medium, a rewritable information recording medium, and a recording/reproducing apparatus and method, by which data for access control is appropriately managed to secure recording/reproduction compatibility, and a computer-readable recording medium storing a program for executing the method.

2. Description of the Related Art

The standards for optical systems including optical disc drive systems and optical discs have to be frequently updated in light of the developments of optical disc technology and semiconductor technology. FIG. 1 is a diagram for explaining problems related to standard updating. Generally a new standard is obtained by adding new functions to an old standard. An old standard disc 12 is designed to operate in an old standard drive system 11, whereas a new standard disc 14 is designed to operate in a new standard drive system 13.

The old standard and the new standard may or may not provide recording/reproducing compatibility. If the recording/reproducing compatibility is assured, the old standard disc 12 and the new standard disc 14 can be recorded/reproduced in both of the old and new standard drive systems 11 and 13. For example, when the new standard disc 14 is loaded into the old standard drive system 11, the old standard drive system 11 should properly operate in response to newly added functions in the new standard. Therefore, the standards should be designed by considering the necessity of updating them continuously.

Accordingly, it is necessary to define rules that allow a drive system to perform functions recognized by a current standard and rules that allow the same drive system to perform new functions not recognized by the current standard. In a case where a future standard is made by adding a new function to a current standard, if a future standard drive system stores on a disc information regarding operations that a current standard drive system needs to perform for the new function, the current standard drive system can read the information from the disc adapted to the new function and perform the operations for the new function.

In this respect, a method of enabling a current standard drive system to access control information related to a new standard disc loaded into the current standard drive system is desired. Furthermore, a method of efficiently managing data for the access control is desired.

SUMMARY OF THE INVENTION

Aspects of the present invention provide an information recording medium, a write-once information recording medium, a rewritable information recording medium, and a recording/reproducing apparatus and method, by which access control data is efficiently managed to secure compatibility between discs and drive systems, and a computer-readable recording medium storing a program for executing the method.

According to an aspect of the present invention, there is provided an information recording medium including an access control area in which access control data (ACD) is recorded, the ACD having common information set to allow a recording/reproducing apparatus that cannot recognize a predetermined function of the information recording medium to control access to the information recording medium; and an ACD state information area including state information regarding one of defectiveness and recordability of an ACD block at which the ACD is recorded in the access control area.

According to an aspect of the present invention, the state information includes a first defective state selectable between and indicating at least on of a state that the ACD block is detected as defective while the ACD is recorded in the ACD block, a state that the ACD block has invalid ACD, a state that the ACD block has old and invalid ACD and updated ACD has been recorded in another ACD block, a state that the ACD block is an unrecorded block filled with predetermined data according to finalization of the information recording medium, or combinations thereof.

According to an aspect of the present invention, the state information includes a second defective state indicating that the ACD block has valid ACD but is detected as defective while the valid ACD is reproduced from the ACD block.

According to an aspect of the present invention, the state information includes a third defective state selectable between and indicating one of a state that the ACD block is detected as defective while the ACD is recorded in the ACD block and a state that the ACD block has invalid ACD.

According to an aspect of the present invention, the ACD state information area is included in a disc definition structure that is recorded for disc management in a defect management area included in a lead-in area on the information recording medium.

According to an aspect of the present invention, the common information includes an ID identifying a function; formatability information indicating whether the information recording medium is formatable; recordability/reproducibility information indicating whether a spare area on the information recording medium is recordable/reproducible; and recordability/reproducibility information indicating whether a user data area on the information recording medium is recordable/reproducible, and recordability/reproducibility information indicating whether the defect management area is recordable/reproducible may be excluded from the common information.

According to another aspect of the present invention, there is provided a write-once information recording medium including an access control area in which ACD is recorded, the ACD having common information set to allow a recording/reproducing apparatus that cannot recognize a predetermined function of the write-once information recording medium to control access to the write-once information recording medium; and an ACD state information area in which state information regarding one of defectiveness and recordability of an ACD block, at which the ACD is recorded in the access control area, is recorded.

According to an aspect of the present invention, the state information includes a first state that the ACD block is available for recording of ACD, a second state that the ACD block is a defective block, a third state that the ACD block has valid ACD but is detected as defective while the valid ACD is reproduced from the ACD block, and a fourth state that the ACD block has valid ACD.

According to an aspect of the present invention, the access control area is sequentially used from an inner to outer radius of the write-once information recording medium or from the outer to inner radius of the write-once information recording medium.

According to an aspect of the present invention, when the ACD block in the access control area is detected as defective while the ACD is recorded in the ACD block or as a result of verification of the recording, the ACD may be recorded in a subsequent ACD block in the access control area.

According to still another aspect of the present invention, there is provided a rewritable recording medium including an access control area in which ACD is recorded, the ACD having common information set to allow a recording/reproducing apparatus that cannot recognize a predetermined function of the rewritable recording medium to control access to the rewritable recording medium; and an ACD state information area in which state information regarding one of defectiveness and recordability of an ACD block, at which the ACD is recorded in the access control area, is recorded.

According to an aspect of the present invention, the state information includes a first state indicating that the ACD block is available for recording of ACD, a second state indicating that the ACD block is detected as defective while the ACD is recorded in the ACD block or that the ACD block has invalid ACD, a third state indicating that the ACD block has valid ACD but is detected as defective while the valid ACD is reproduced from the ACD block, and a fourth state that the ACD block has valid ACD.

According to yet another aspect of the present invention, there is provided a recording/reproducing apparatus including a writing/reading unit writing data to or reading data from an information recording medium having an access control area in which ACD is recorded, the ACD having common information set to allow the recording/reproducing apparatus that cannot recognize a predetermined function of the information recording medium to control access to the information recording medium; and a control unit controlling the writing/reading unit to record state information regarding one of defectiveness and recordability of an ACD block, at which the ACD is recorded in the access control area, in an ACD state information area provided on the information recording medium.

According to an aspect of the present invention, when the ACD recorded in the ACD block is updated, the control unit along with references cited therein controls the writing/reading unit to change the state information regarding the ACD block into the defective state indicating that the ACD block has invalid ACD and to record updated ACD in a subsequent available ACD block in the access control area.

According to an aspect of the present invention, when the ACD recorded in the ACD block is not valid any more, the control unit controls the writing/reading unit to overwrite the ACD block with a predetermined value and to change the state information regarding the ACD block into a state indicating that the ACD block is available to allow other ACD to be recorded in the ACD block.

According to an aspect of the present invention, when the ACD block in the access control area is detected as defective while the ACD is written to the ACD block or as a result of verification of the writing, the control unit controls the writing/reading unit to record the ACD in a subsequent ACD block in the access control area.

According to a further aspect of the present invention, there is provided a recording/reproducing method including recording state information regarding one of defectiveness and recordability of an ACD block, at which ACD is recorded in an access control area provided on an information recording medium, in an ACD state information area provided on the information recording medium, the ACD having common information set to allow the recording/reproducing apparatus that cannot recognize a predetermined function of the information recording medium to control access to the information recording medium.

According to another aspect of the present invention, there is provided a computer-readable recording medium storing a program used by a computer for executing a recording/reproducing method, the method including recording state information regarding one of defectiveness and recordability of an ACD block, at which ACD is recorded in an access control area provided on an information recording medium, in an ACD state information area provided on the information recording medium, the ACD having common information set to allow the recording/reproducing apparatus that cannot recognize a predetermined function of the information recording medium to control access to the information recording medium.

According to still another aspect of the present invention, there is provided a write-once information recording medium including an access control area in which ACD is recorded, the ACD having common information set to allow a recording/reproducing apparatus that cannot recognize a predetermined function of the write-once information recording medium to control access to the write-once information recording medium; and a temporary defect management area (TDMA) including a temporary disc definition structure (TDDS) in which state information regarding one of defectiveness and recordability of an ACD block, at which the ACD is recorded in the access control area, is recorded, wherein the ACD includes at least one among an ACD_ID indicating an ID of the predetermined function, formatability information indicating whether the write-once information recording medium is formatable, TDMA recordability information indicating whether the TDMA except for the TDDS is recordable, data area recordability/reproducibility information indicating whether the data area is recordable/reproducible, or combination thereof.

According to an aspect of the present invention, when the TDMA is assigned in the data area, the data area recordability/reproducibility information may not include recordability/reproducibility information indicating whether the TDMA assigned in the data area is recordable/reproducible.

According to yet another aspect of the present invention, there is provided a rewritable information recording medium including an access control area in which ACD is recorded, the ACD having common information set to allow a recording/reproducing apparatus that cannot recognize a predetermined function of the information recording medium to control access to the information recording medium; and a defect management area (DMA) including a disc definition structure (DDS) in which state information regarding one of defectiveness and recordability of an ACD block, at which the ACD is recorded in the access control area, is recorded, wherein the ACD includes at least one among an ACD_ID indicating an ID of the predetermined function, formatability information indicating whether the write-once information recording medium is formatable, DMA recordability information indicating whether the DMA except for the DDS is recordable, and data area recordability/reproducibility information indicating whether the data area is recordable/reproducible.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and/or advantages of the present invention will become more apparent and more readily appreciated by describing in detail embodiments thereof with reference to the accompanying drawings in which.

DETAILED DESCRIPTION OF THE EMBODIMENTS

Figure 1:
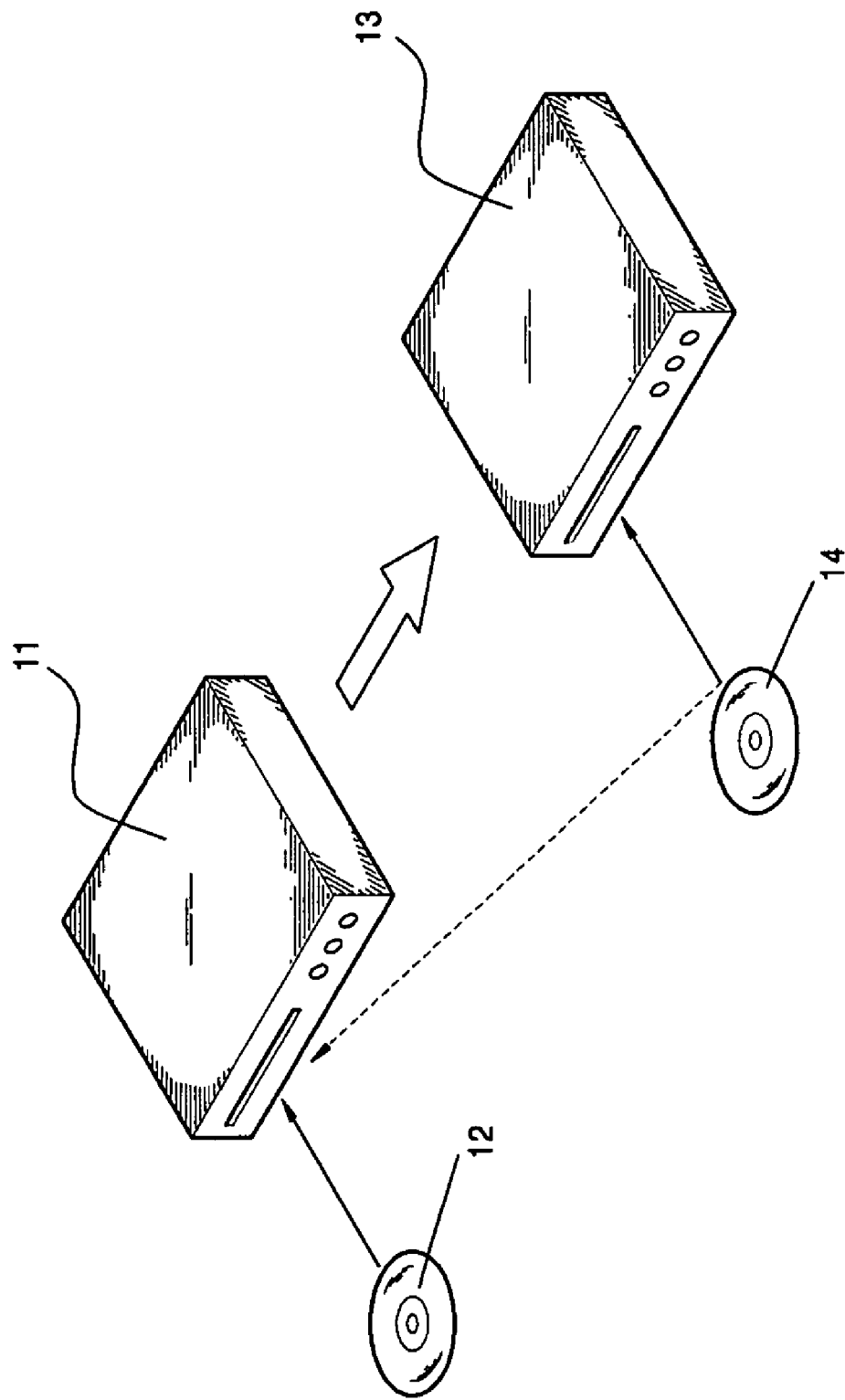
FIG. 1 is a diagram for explaining compatibility between discs and drive systems of different standards in the conventional technology.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
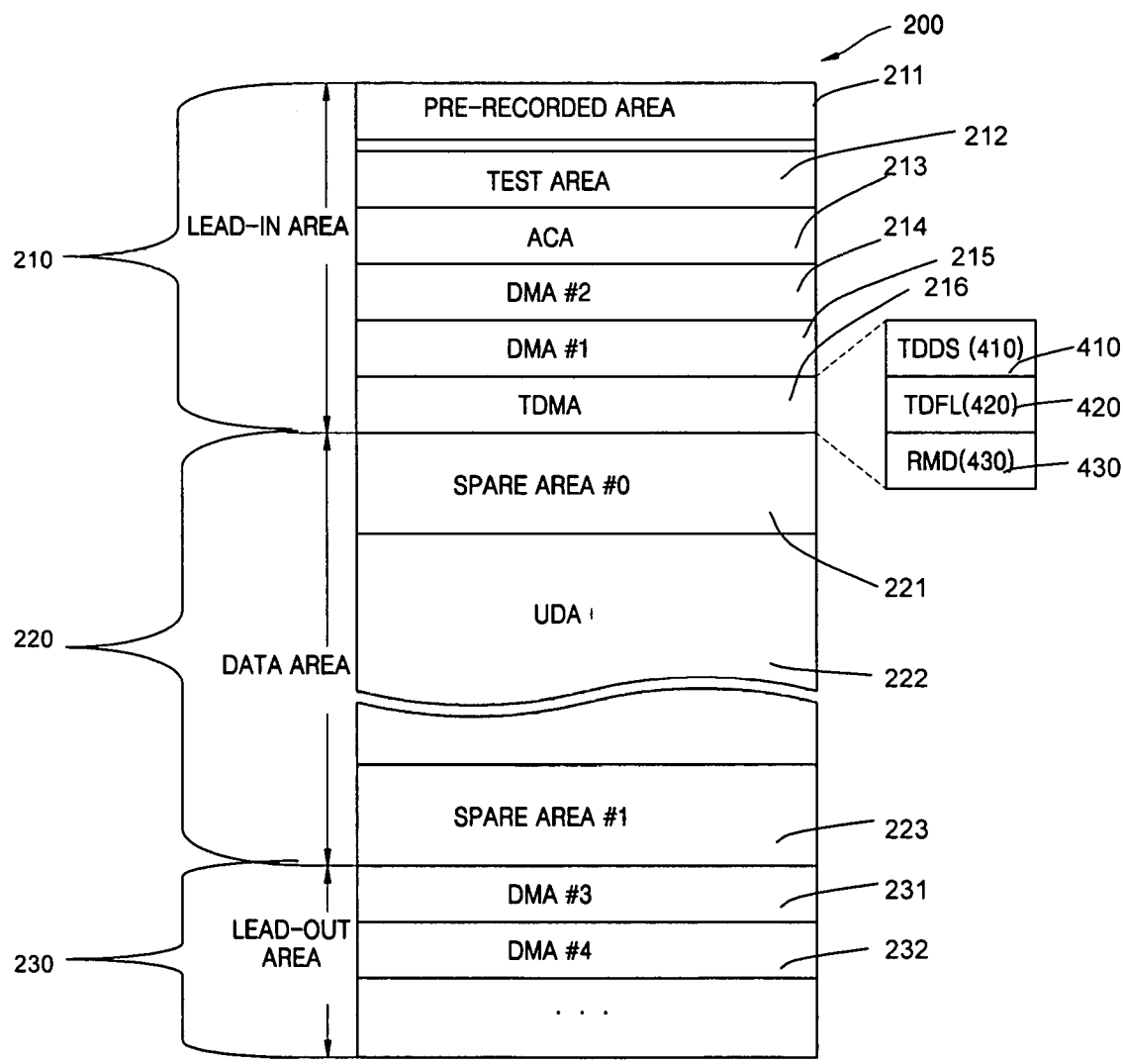
FIG. 2 illustrates a structure of a write-once information recording medium according to an embodiment of the present invention.

FIG. 2 illustrates a structure of a write-once information recording medium, i.e., a write-once disc 200, according to an embodiment of the present invention. Referring to FIG. 2, the disc 200 sequentially includes a lead-in area 210, a data area 220, and a lead-out area 230.

The lead-in area 210 includes a pre-recorded area 211 in which predetermined data is recorded when the disc 200 is manufactured, a test area 212, an access control area (ACA) 213, a defect management area (DMA) #2 214, a DMA #1 215, and a temporary DMA (TDMA) 216. The pre-recorded area 211 can be used only for reading. The test area 212, the ACA 213, the DMA #2 214, the DMA #1 215, and the TDMA 216 are areas to which data can be written and rewritten. It is understood that additional and/or fewer DMAs, TDMAs, test areas, pre-recorded area, and/or ACAs can be used, and that the pre-recorded area could also be used for recording in alternative embodiments of the invention.

The pre-recorded area 211 stores information regarding the disc 200 that is recorded when the disc 200 is manufactured. For example, the pre-recorded area 211 stores a disc ID such as a disc manufacturing number that identifies the disc 200. However, it is understood that additional read only information can be recorded in the pre-recorded area 211.

The test area 212 is provided to test the recording power or the like for optimal recording on the disc 200.

The ACA 213 is provided to record information prescribing operations of a drive system for a new function to be added afterwards. Common information enabling a drive system that cannot recognize a certain function to access the disc 200 is recorded in the ACA 213, an example of which will be described in detail with reference to FIG. 3.

The DMA #1 215 and the DMA #2 214 are provided to record information regarding a defect occurring in a user data area (UDA) 222. When no data can be written to the disc 200 since the disc 200 is finalized, final temporary defect management information recorded in the TDMA 216 is recorded in a DMA as final defect management information.

The TDMA 216 is an area in which temporary management information for managing a defect occurring during use of the disc 200 and for managing data recording on the disc 200 is recorded and updated. The TDMA 216 includes a temporary disc definition structure (TDDS) 410, a temporary defect list (TDFL) 420, and recording management data (RMD) 430. The TDDS 410 includes an area in which state information regarding an access control data (ACD) block included in the ACA 213 is recorded. An example of the area will be described in detail with reference to FIG. 4. However, it is understood that the state information can be recorded in other areas of the disc 200.

The data area 220 includes a spare area #0 221, the UDA 222, and a spare area #1 223. The UDA 222 is provided to record user data. The spare area #0 221 and the spare area #1 223 provide spare blocks replacing defective blocks occurring in the UDA 222. Such spare area is allocated to the data area 222 during initialization or reinitialization of the disc 200.

The lead-out area 230 includes a DMA #3 231 and a DMA #4 232. A plurality of DMAs is provided to increase the reliability of the disc 200 by repeatedly recording the same final defect management information in a plurality of portions on the disc 200. However, it is understood that additional or fewer numbers of DMAs and other areas can be used, and/or recorded in other areas of the disc 200.

Figure 3A:
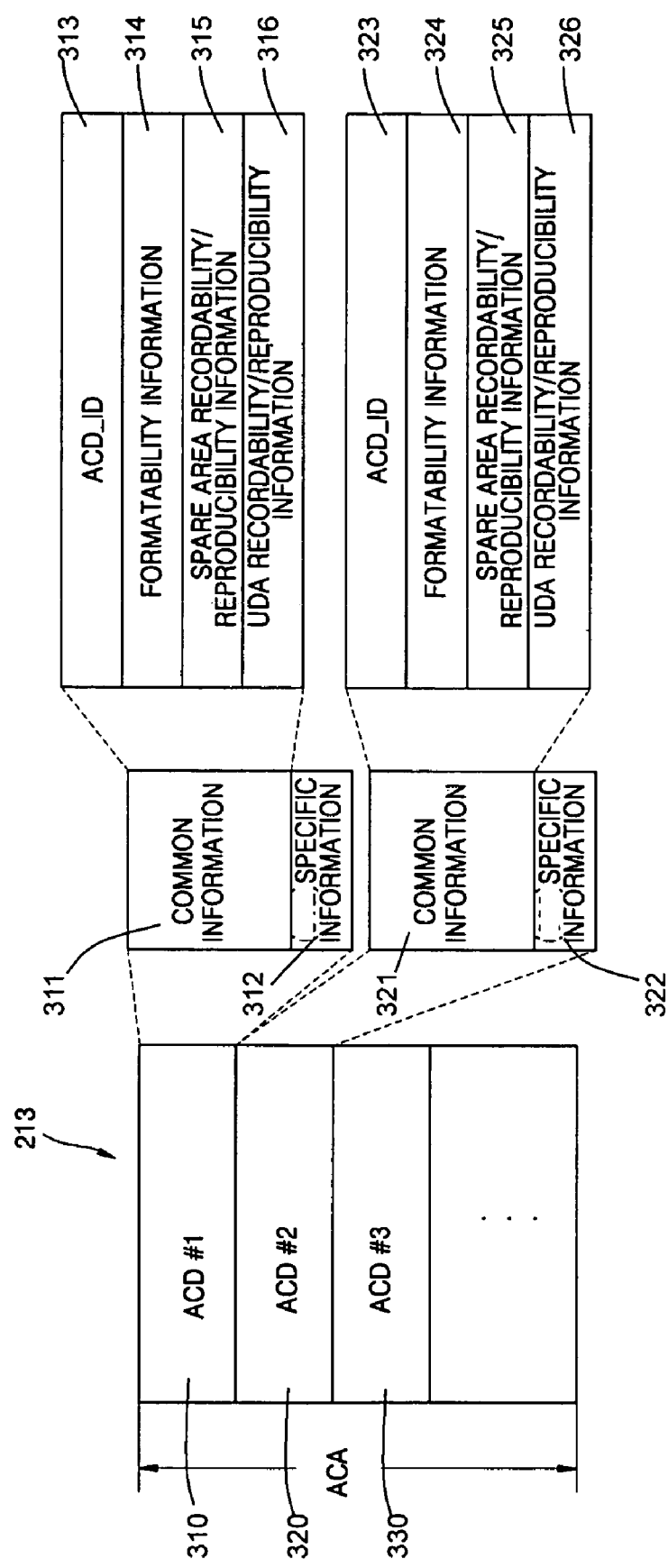
FIG. 3A illustrates an example of a structure of an access control area (ACA) shown in FIG. 2.

FIG. 3A illustrates a first example of a structure of the ACA 213 shown in FIG. 2. Referring to FIG. 3A, the ACA 213 includes an ACD #1 310, an ACD #2 320, and an ACD #3 330.

The ACA 213 is an area in which common information used to access a disc regardless of existing or new standards is recorded. In other words, the ACA 213 stores a common information table applied in common to all functions used in existing standards and new standards. ACD constitutes a common information table regarding each function. For example, the ACD #1 310 constitutes a common information table regarding "function1", the ACD #2 320 constitutes a common information table regarding "function2", and the ACD #3 330 constitutes a common information table regarding "function3". The functions may be recognized by a drive system, and the function2 and the function3 may not be recognized by the drive system. ACD may also include specific information that only a drive system recognizing a function corresponding to the ACD can recognize, but need not in all aspects of the invention.

The ACD #1 310 includes common information 311 and specific information 312. The common information 311 includes an ACD_ID 313, (i.e., an ID identifying ACD), formatability information 314 indicating whether the disc can be formatted, spare area recordability/reproducibility information 315 indicating whether a spare area is recordable or is only reproducible, and UDA recordability/reproducibility information 316 indicating whether a UDA is recordable or is only reproducible.

A drive system can determine based on the ACD_ID 313 whether the ACD #1 310 is about a recognizable function. In other words, if the drive system knows the ACD_ID 313, the ACD #1 310 is determined as being about a recognizable function. Otherwise, the ACD #1 310 is determined as being about an unrecognizable function.

In addition, even though the drive system does not know the ACD_ID 313, the drive system can perform at least minimum proper operations with respect to an unrecognizable function based on fields included in the common information table.

The ACD #2 320 also includes common information 321 and specific information 322. The common information 321 includes an ACD_ID 323 and common information table containing formatability information 324, spare area recordability/reproducibility information 325, and UDA recordability/reproducibility information 326.

It is preferable, but not required, that the ACA 213 is sequentially used from an inner to outer radius of a disc 200 or from an outer to inner radius of the disc 200. In addition, when a defect is detected while data is written to an ACD block in the ACA 213 or as a result of verification after writing, data is recorded in a subsequent ACD block.

Meanwhile, common information of ACD may further include recordability/reproducibility information regarding an area other than a spare area and a UDA 222 on the disc 200. However, it is preferable, but not required, that the common information does not include recordability/reproducibility information regarding a TDMA 216. State information regarding an ACD block in which ACD is recorded within the ACA 213 is recorded in the TDMA 216. Accordingly, if the ACD's common information is set to prohibit writing to the TDMA, the state information regarding an ACD block cannot be recorded or updated.

In other words, since state information regarding an ACD block in the ACA 213 is recorded in a TDDS 410 included in the TDMA 216, recordability/reproducibility information regarding the TDMA 216 should not be defined in the ACD. If the recordability/reproducibility information regarding the TDMA 216 is defined in ACD and is set to prohibit writing to the TDMA 216, when a new ACD block is added or an existing ACD block is changed in the ACA 213, changed ACD state information cannot be recorded in the TDMA 216. In this case, a real state of each of ACD blocks included in the ACA 213 cannot be known, which makes it difficult to obtain valid ACD.

Meanwhile, according to usage of a write-once information recording medium, the TDMA 216 may be entirely or partially included in a spare area 221. In this case, spare area recordability/reproducibility information should not include information regarding the TDMA 216 because it is preferable that the ACD's common information does not include TDMA 216 recordability/reproducibility information.

Figure 3B:
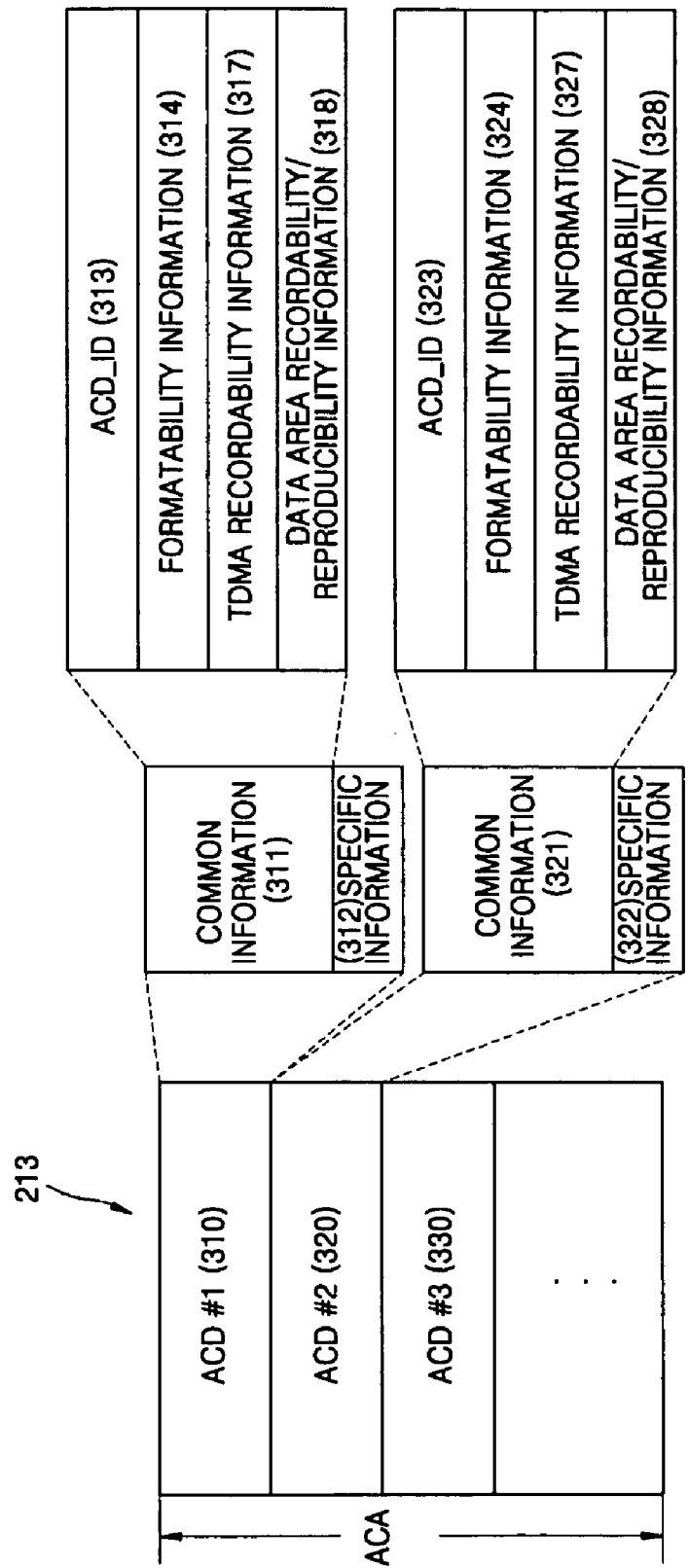
FIG. 3B illustrates an example of the structure of the ACA shown in FIG. 2.

FIG. 3B illustrates another example of the structure of the ACA 213 shown in FIG. 2. The second example shown in FIG. 3B is similar to the example shown in FIG. 3A, with the exception that the common information 311 includes TDMA recordability information 317 and data area recordability/reproducibility information 318 and the common information 321 includes TDMA recordability information 327 and data area recordability/reproducibility information 328.

In particular, contrary to the example shown in FIG. 3A, the TDMA recordability information 317, 327 shown in FIG. 3B is included in the common information 311, 312. However, the TDMA recordability information 317, 327 does not include information regarding a TDDS included in a TDMA 216 to always enable ACD state information to be recorded in the TDDS even when the TDMA recordability information 317, 327 is set to prohibit writing to the TDMA 216.

Meanwhile, although not shown in FIG. 2, the TDMA 216 may be assigned in a data area, such as UDA 222. In this embodiment, the TDDS 410 in which ACD's state information is recorded may be included in the TDMA 216 assigned in the data area. In this case, the TDDS included in the data area should be also recordable/reproducible even when writing to/reading from the data area is prohibited.

In other words, the TDMA recordability information 317, 327 is information regarding recordability of all portions of the TDMA 216 except for the TDDS 410, and the data area recordability/reproducibility information 318, 328 is information regarding recordability/reproducibility of all portions of the data area except for the TDDS 410 or TDMA 216. That is, the TDDS 410 should be always recordable on a write-once embodiment of the information recording medium.

Figure 4:
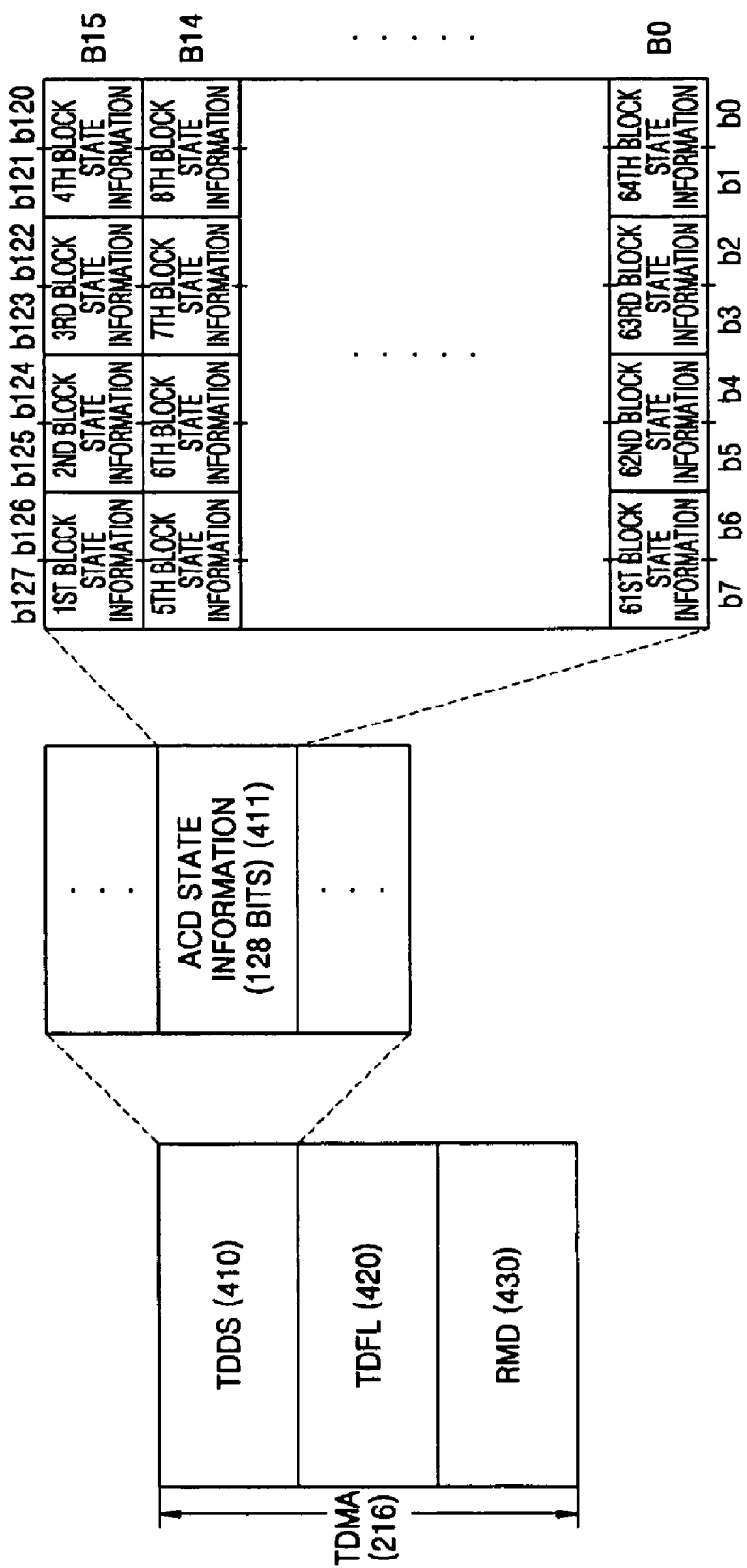
FIG. 4 illustrates a detailed structure of a temporary defect management area (TDMA) provided with an area in which access control data (ACD) state information is recorded according to an embodiment of the present invention.

FIG. 4 illustrates a detailed structure of the TDMA 216 provided with an area in which ACD state information is recorded according to an embodiment of the present invention. Referring to FIG. 4, the TDMA 216 includes the TDDS 410, the TDFL 420, and the RMD 430.

The TDFL 420 is an area in which information regarding a defect occurring in a UDA 222 (e.g., an address of a defective block and an address of a block replacing the defective block), are recorded for temporary defect management. The RMD 430 is an area for recording management. The RMD 430 is managed according to a recording mode. When a recording medium is used in a sequential recording mode, the RMD 430 is managed according to sequential recording information. When the recording medium is used in a random recording mode, the RMD 430 is managed according to a space bit map (SBM). The TDDS 410 is an area in which disc management information is recorded for temporary disc management. In particular, ACD state information 411 is recorded in the TDDS 410 according to an embodiment of the present invention.

The ACD state information 411 contains a state of every ACD block in the ACA 213. Referring to FIG. 4, two bits are assigned for state information regarding a single ACD block. Thus, to record state information regarding 64 blocks defined in the ACA 213, 64*2=128 bits are assigned to the ACD state information 411. Accordingly, 16 bytes B0, . . . , B14, B15 are assigned for state information regarding every ACD block in the ACA 213. However, it is understood that this number of blocks and/or bits can vary.

Figure 5:
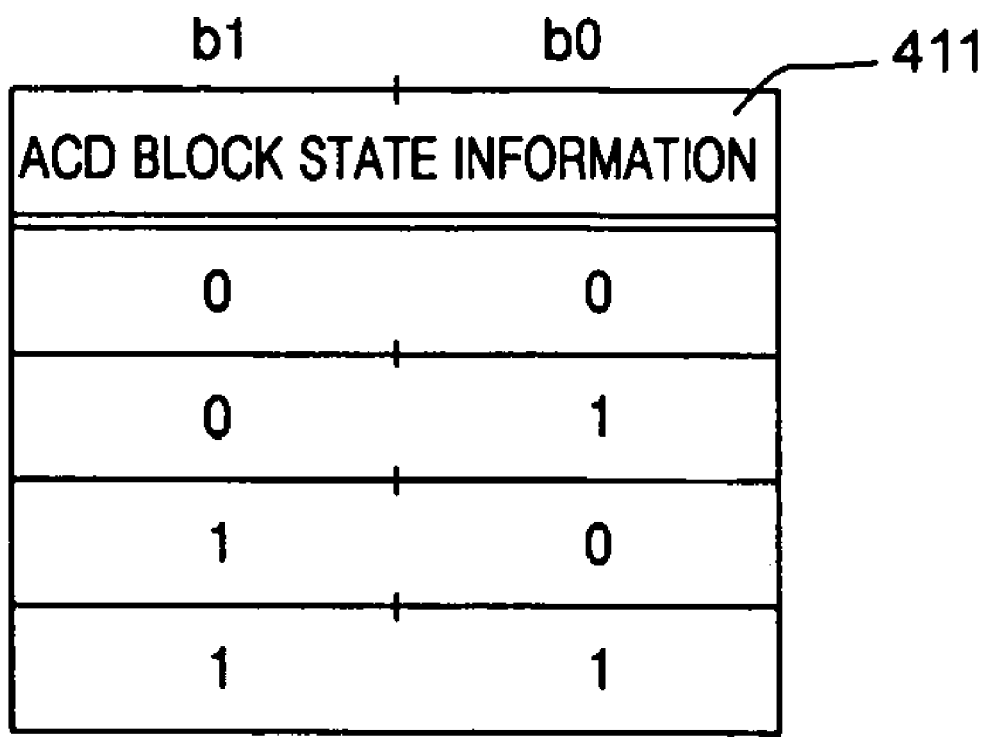
FIG. 5 illustrates ACD state information according to an embodiment of the present invention.

FIG. 5 illustrates examples of ACD block state information 411 included in the ACD state information 411. Referring to FIG. 5, a state of each ACD block is expressed with 2 bits, i.e., "00", "01", "10,", or "11" indicating one among four states.

In the shown example, bits "00" indicate that an ACD block is available for recording ACD. Bits "01" indicate that the ACD block is defective. More specifically, bits "01" indicate one among a state that the ACD block is detected as defective while ACD is recorded in the ACD block in an ACA, a state that the ACD block has invalid ACD, a state that the ACD block has old and invalid ACD and updated ACD having the same ACD_ID as the old and invalid ACD has been recorded in another ACD block according to a request to updated ACD, and a state that the ACD block is an unrecorded block filled with particular data according to finalization of a write-once disc. Bits "10" indicate that the ACD block has valid ACD but is detected as defective while ACD is reproduced from the ACA. Bits "11" indicate that the ACD block has valid ACD. However, it is understood that the bit combinations can be otherwise assigned.

When an ACD update is requested during use of a disc, bits recorded in a TDDS to indicate a state of an ACD block having old ACD are changed into "01" to indicate that the ACD block has invalid ACD, and updated ACD having the same ACD_ID as the old ACD is recorded in a subsequent available ACD block in the ACA 213.

Figure 6A:
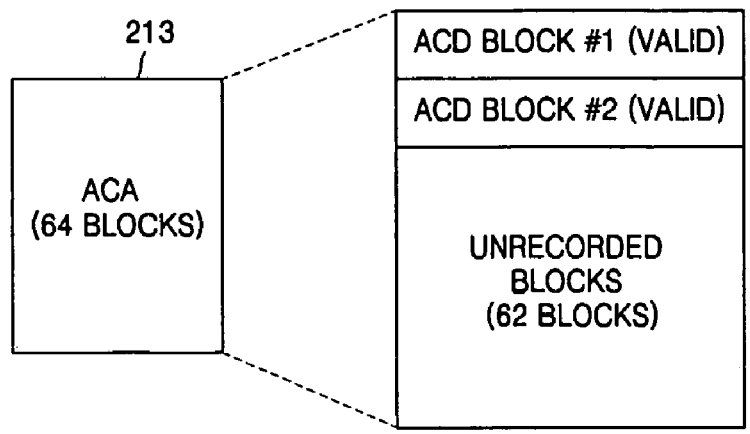
FIG. 6A illustrates a first example of states of ACD blocks in the ACA shown in FIG. 2.

An example of recording ACD block state information 411 will be described below in detail with reference to FIGS. 6A through 8B. FIG. 6A illustrates an example of states of ACD blocks in the ACA 213 shown in FIG. 2. Referring to FIG. 6A, the ACA 213 includes 64 blocks and includes two ACD blocks #1 and #2 having valid ACD, and the other 62 blocks that have no data recorded therein and are available for recording.

Figure 6B:
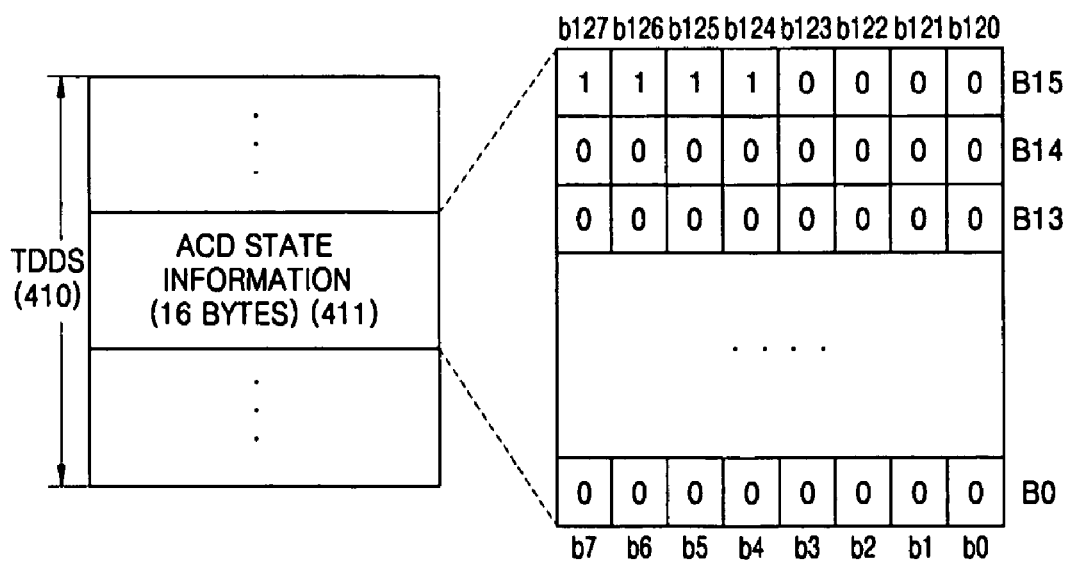
FIG. 6B illustrates an example of ACD state information included in a temporary disc definition structure (TDDS) in accordance with the states of the ACD blocks shown in FIG. 6A.

FIG. 6B illustrates an example of the ACD state information 411 included in the TDDS 410 in accordance with the states of the ACD blocks shown in FIG. 6A. Referring to FIG. 6B, the TDDS 410 includes an area with a size of 16 bytes to store the ACD state information 411 containing state information regarding the 64 blocks included in the ACA 213 shown in FIG. 6A. To indicate that the ACD blocks #1 and #2 have the valid ACD, bits "11" are recorded as state information in positions b127 and b126, and bits "11" are recorded as state information in positions b125 and b124. To indicate that the other 62 blocks have not been used and are available for ACD recording, "0" is recorded in each of positions b123 through b0 so that state information regarding each of the 62 blocks is expressed by bits "00".

Figure 7A:
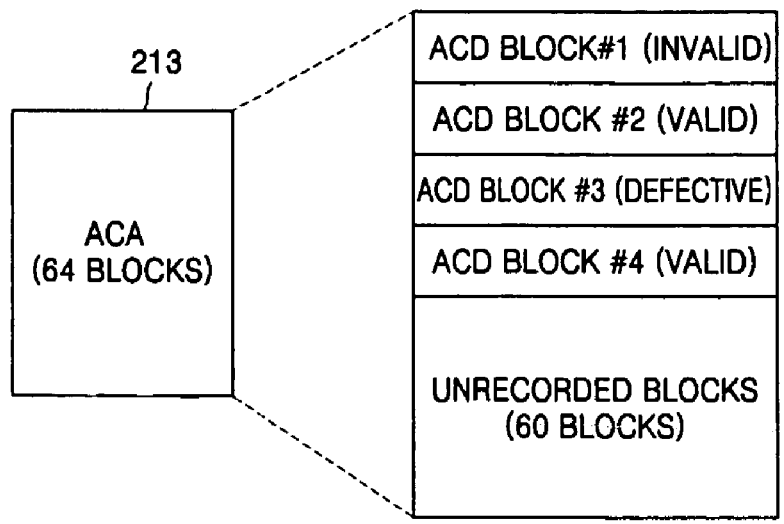
FIG. 7A illustrates a second example of states of the ACD blocks in the ACA shown in FIG. 2.
Figure 7B:
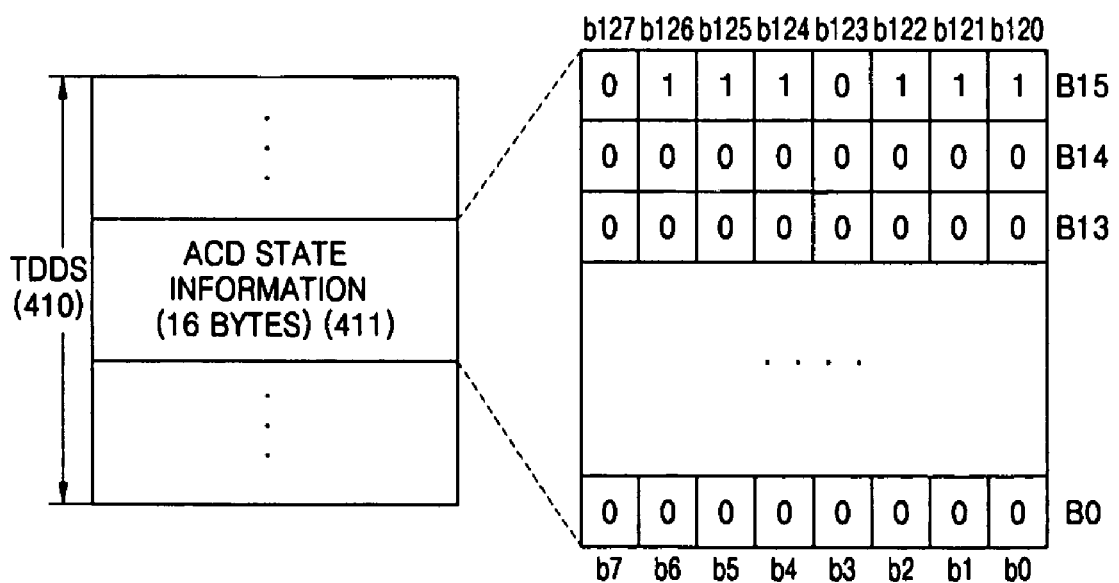
FIG. 7B illustrates an example of ACD state information included in the TDDS in accordance with the states of the ACD blocks shown in FIG. 7A.

FIGS. 7A and 7B illustrate changes in the ACD state information 411 recorded in the TDDS 410 according to the ACD updated and occurrence of a defective block. FIG. 7A illustrates an example of states of the ACD blocks in the ACA 213 shown in FIG. 2. In a case where an update of the ACD recorded in the ACD block #1 shown in FIG. 6A is requested, if a defect is detected while updated ACD is recorded in a subsequent available block, (i.e., an ACD block #3), in response to the update request or if a defect is detected through verification after the updated ACD is recorded, the updated ACD is recorded in an ACD block #4. As a result, the ACD block #1 has invalid ACD, the ACD block #3 is defective, and the ACD block #4 has valid ACD. The other 60 blocks in the ACA 213 remain unrecorded and available.

FIG. 7B illustrates an example of the ACD state information 411 included in the TDDS 410 in accordance with the states of the ACD blocks shown in FIG. 7A. Referring to FIG. 7B, since the ACD recorded in the ACD block #1 in the ACA 213 is not valid any more due to the update of the ACD, bits at the positions b127 and b126 in the TDDS 410 are changed into "01". Since there is no change in the ACD block #2, state information regarding the ACD block #2 remains. Since the ACD block #3 has been detected as being defective during writing or as a result of verification after writing, bits at positions b123 and b122 are changed into "01". Since the update, valid ACD has been recorded in the ACD block #4, bits at positions b121 and b120 are changed into "11".

Figure 8A:
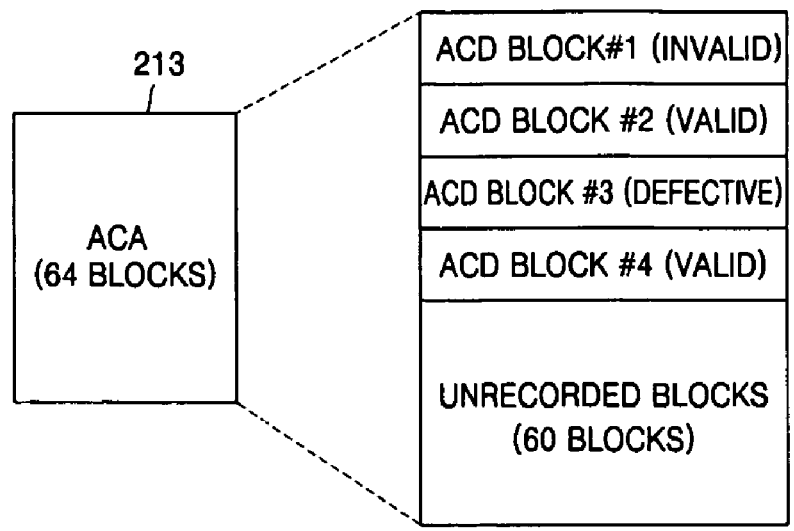
FIG. 8A illustrates a third example of states of the ACD blocks in the ACA shown in FIG. 2.
Figure 8B:
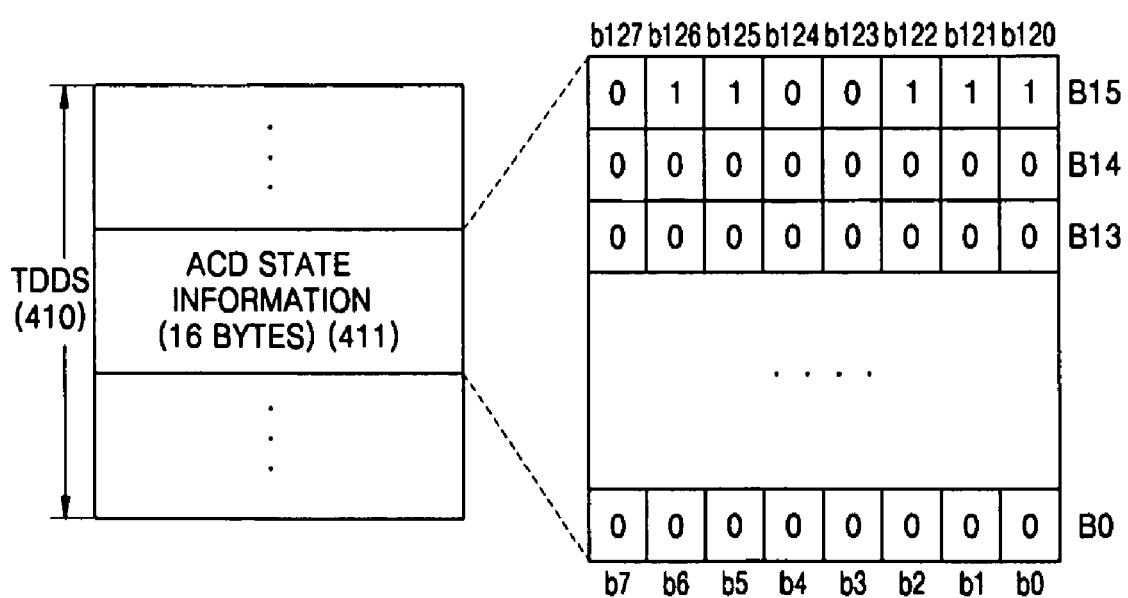
FIG. 8B illustrates an example of ACD state information included in the TDDS in accordance with the states of the ACD blocks shown in FIG. 8A.

FIGS. 8A and 8B illustrate changes in the ACD state information 411 recorded in the TDDS 410 according to an error occurring while an ACD block is reproduced. FIG. 8A illustrates an example of states of the ACD blocks in the ACA 213 shown in FIG. 2. A write-once information recording medium having a state of the ACA 213 shown in FIG. 7A may be loaded into a drive system, and an error occurring while the valid ACD respectively recorded in the ACD blocks # 2 and 4 in the ACA 213 are reproduced based on the ACD state information 411 included in the TDDS 410 shown in FIG. 7B may not be corrected during the reproduction. Since FIG. 8A illustrates states of the blocks until an error occurs while the ACD recorded in the ACD block #2 is reproduced, the state of the ACA 213 shown in FIG. 8A is the same as that shown in FIG. 7A.

FIG. 8B illustrates an example of the ACD state information 411 included in the TDDS 410 in accordance with the states of the ACD blocks shown in FIG. 8A. Referring to FIG. 8B, to indicate that the ACD recorded in the ACD block #2 in the ACA 213 on a disc is still valid even though it could not been reproduced, bits at the positions b125 and b124 corresponding to the ACD block #2 in the TDDS 410 are changed into "10", so that the valid ACD recorded in the ACD block #2 can be reproduced by a drive system with higher performance than a current drive system that cannot reproduce the valid ACD recorded in the ACD block #2. If the drive system with the higher performance can reproduce the valid ACD recorded in the ACD block #2, the valid ACD may be moved to another normal block. In this situation, when the disc is loaded into another drive system afterwards, the valid ACD moved from the ACD block #2 to the normal block is reproduced from the normal block not from the ACD block #2, thereby providing convenient use of the disc.

In particular, since a final TDDS is recorded as a DDS in a DMA on a write-once disc during finalization preserving a final state of the disc, a change in a recording state of the disc due to an illegal change or addition of data in the ACA 213 on the disc can be detected by comparing ACD state information included in the DDS with an actual state of the ACA 213. This is possible because after the finalization of the disc, ACD state information in the TDDS 410 reflects a final state of the ACA 213 and is copied to the DDS included in the DMA on the disc.

Figure 9:
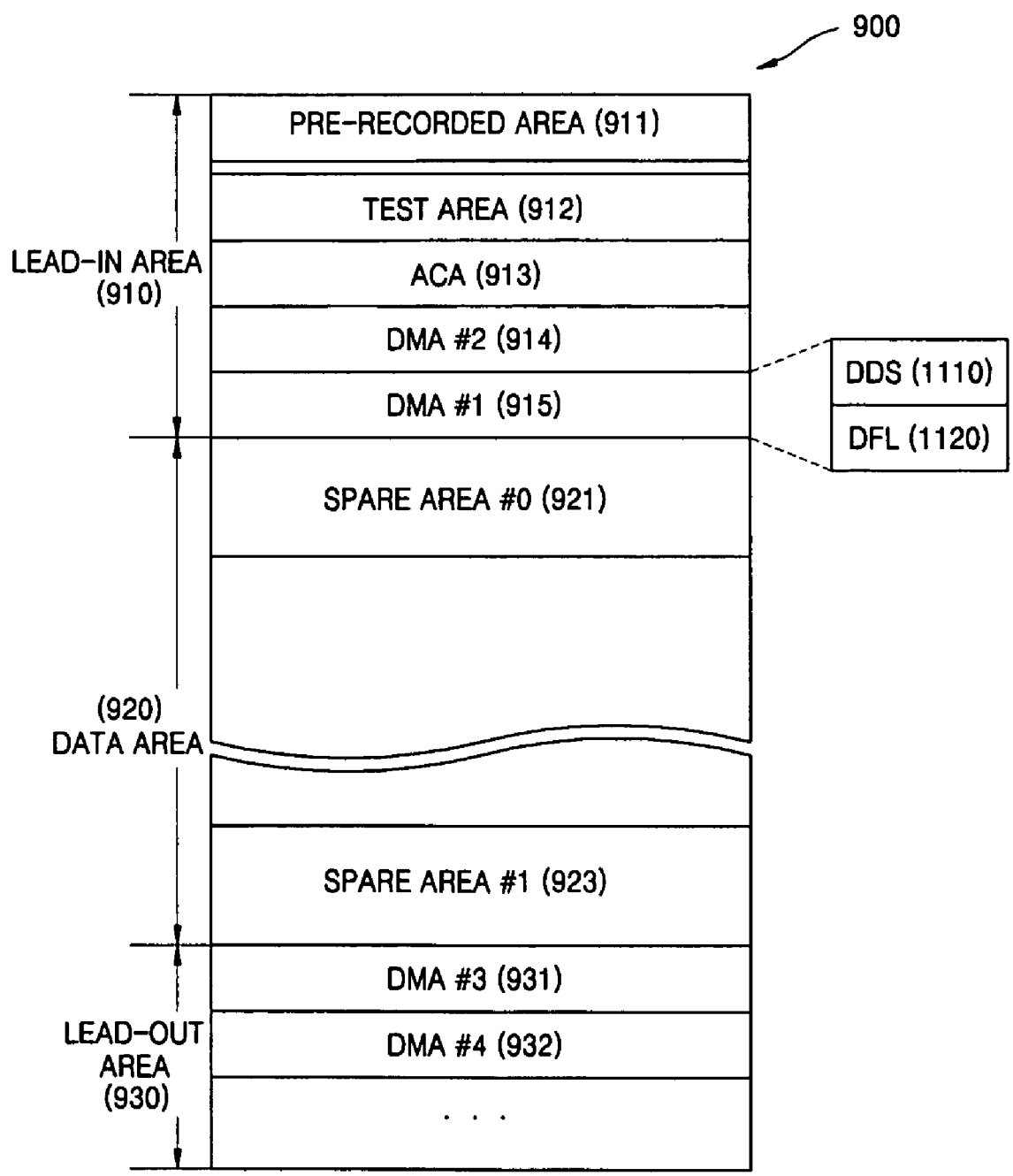
FIG. 9 illustrates a structure of a rewritable recording medium according to an embodiment of the present invention.

FIG. 9 illustrates a structure of a rewritable recording medium (i.e., a rewritable disc), 900 according to an embodiment of the present invention. Referring to FIG. 9, the rewritable disc 900 sequentially includes a lead-in area 910, a data area 920, and a lead-out area 930. The lead-in area 910 includes a pre-recorded area 911 in which predetermined data is recorded when the disc 900 is manufactured, a test area 912, an ACA 913, a DMA #2 914, and a DMA #1 915. The data area 920 includes a UDA 922 in which user data is recorded and a spare area #0 921 and a spare area #1 923 which are assigned to record data recorded in defective blocks in the UDA 922. The lead-out area 930 includes a DMA #3 931 and a DMA #4 932.

The rewritable disc 900 shown in FIG. 9 has substantially the same structure as the write-once disc 200 shown in FIG. 2, with the exception that the rewritable disc 900 has only a DMA for defect management without a TDMA for temporary defect management since data can be rewritten to the rewritable disc 900. A DDS for defect management and disc management and a DFL for defect information are recorded in the DMA on the rewritable disc 900. For example, the DMA #1 915 includes a DDS 1110 and a DFL 1120.

Figure 10A:
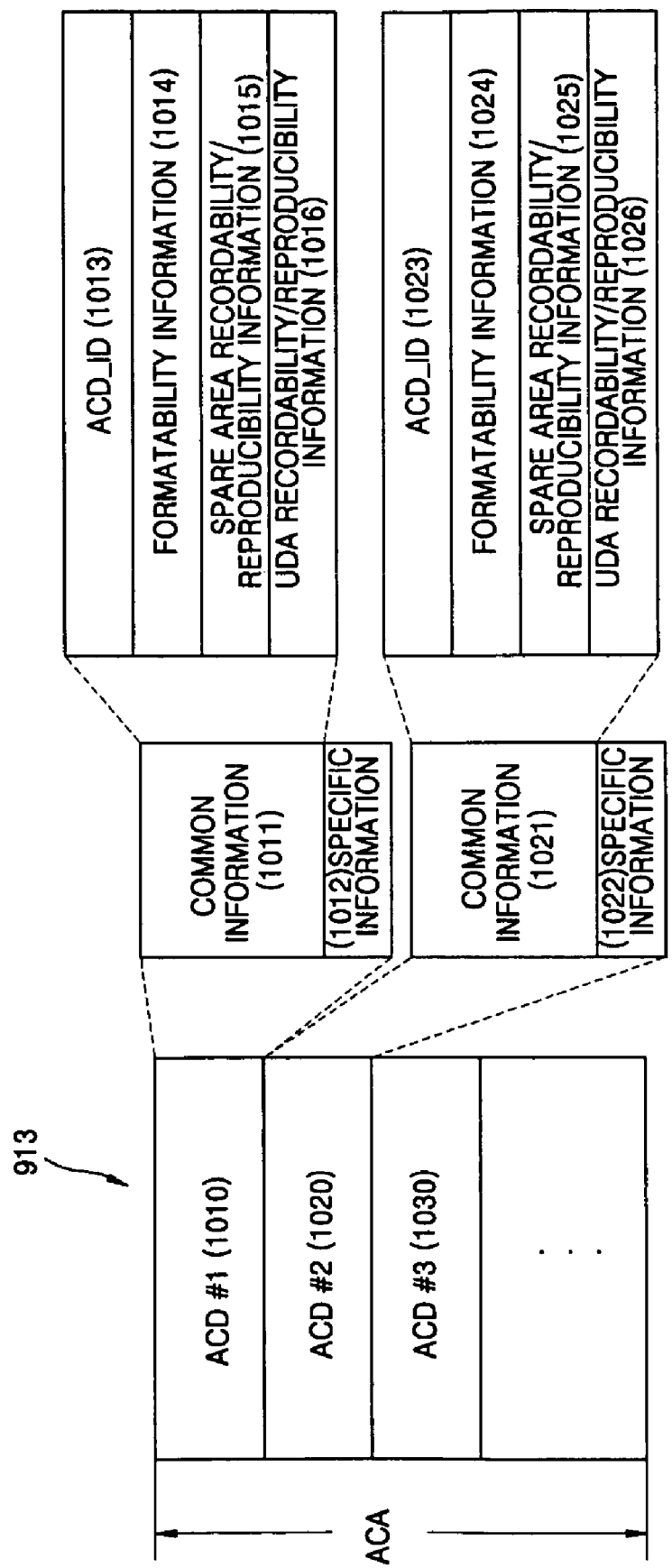
FIG. 10A illustrates an example of an ACA shown in FIG. 9.

FIG. 10A illustrates a first example of the ACA 913 shown in FIG. 9. Referring to FIG. 10A, the ACA 913 includes an ACD #1 1010, an ACD #2 1020, and an ACD #3 1030. The ACD #1 1010 includes common information 1011 and specific information 1012. The common information 1011 includes an ACD_ID 1013, i.e., an ID identifying ACD, formatability information 1014 indicating whether the disc can be formatted, spare area recordability/reproducibility information 1015 indicating whether a spare area is recordable or is only reproducible, and UDA recordability/reproducibility information 1016 indicating whether a UDA is recordable or is only reproducible.

The ACD #2 1020 also includes common information 1021 and specific information 1022. The common information 1021 includes an ACD_ID 1023 and common information table containing formatability information 1024, spare area recordability/reproducibility information 1025, and UDA recordability/reproducibility information 1026.

Figure 10B:
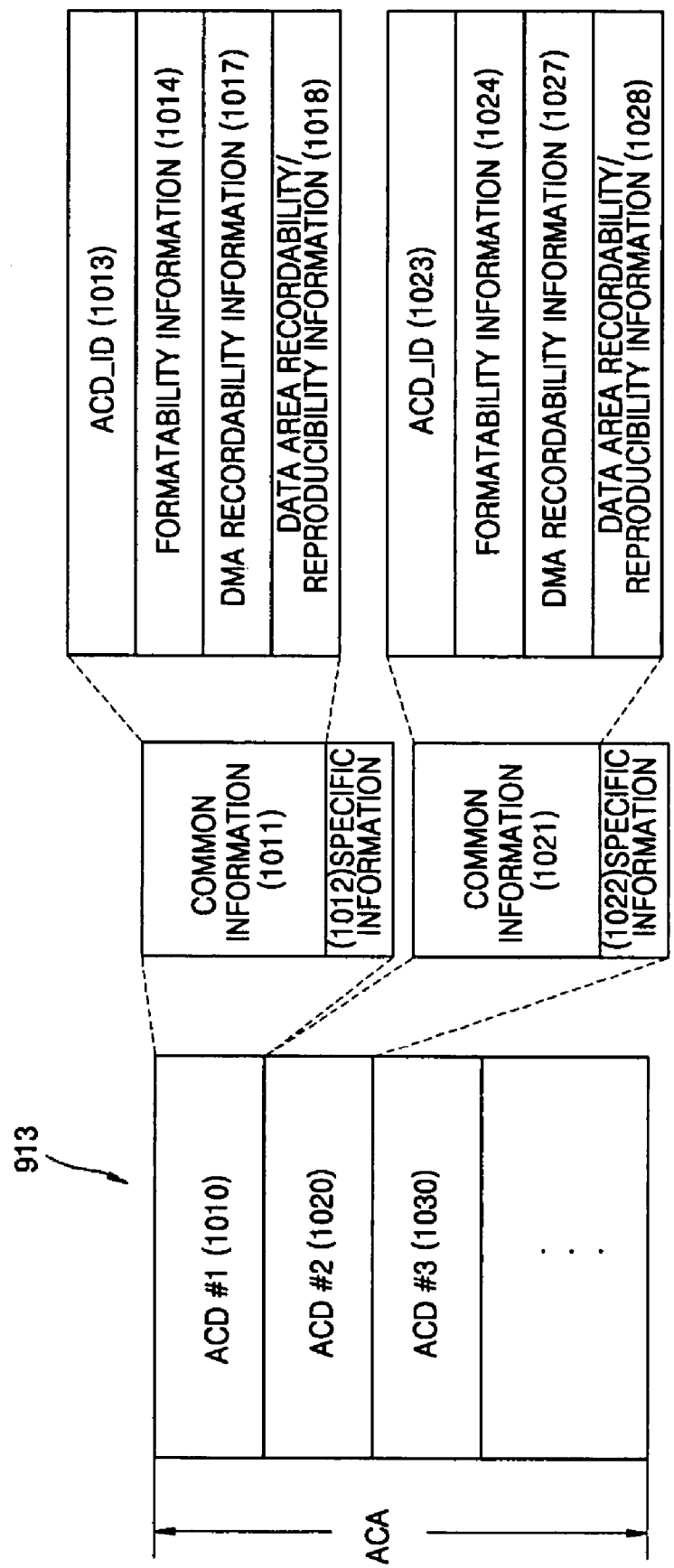
FIG. 10B illustrates an example of the ACA shown in FIG. 9.

FIG. 10B illustrates an example of the ACA 913 shown in FIG. 9. The second example shown in FIG. 10B is the same as the example shown in FIG. 10A, with the exception that the common information 1011 includes DMA recordability information 1017 and data area recordability/reproducibility information 1018 and the common information 1021 shown in FIG. 10B includes DMA recordability information 1027 and data area recordability/reproducibility information 1028.

In particular, unlike the example shown in FIG. 10A, the DMA recordability information 1017, 1027 is included in the common information 1011, 1012 in the second example. However, the DMA recordability information 1017, 1027 does not include information regarding a DDS included in a DMA to always enable ACD state information to be recorded in the DDS even when the DMA recordability information 1017, 1027 is set to prohibit writing to the DMA. That is, the DDS should be always recordable on a rewritable recording medium.

While not required in all aspects, the structure of the ACA in the above-described embodiments is the same for a write-once information recording medium and a rewritable recording medium. When an ACD block is detected as defective during writing to an ACA or as a result of verification after writing, the ACD is recorded in a subsequent available block in the ACA. During reinitialization of a disc, a drive system clears the ACD by recording a predetermined value, e.g., "00h" or "FFh", in whole space in existing ACD blocks in which the ACD has been recorded on the disc. In addition, during initialization or reinitialization, the drive system records ACD regarding a function known to the drive system in the ACA and fills the rest of the ACA remaining unrecorded with a predetermined value, e.g., "00h" or "FFh".

Figure 11:
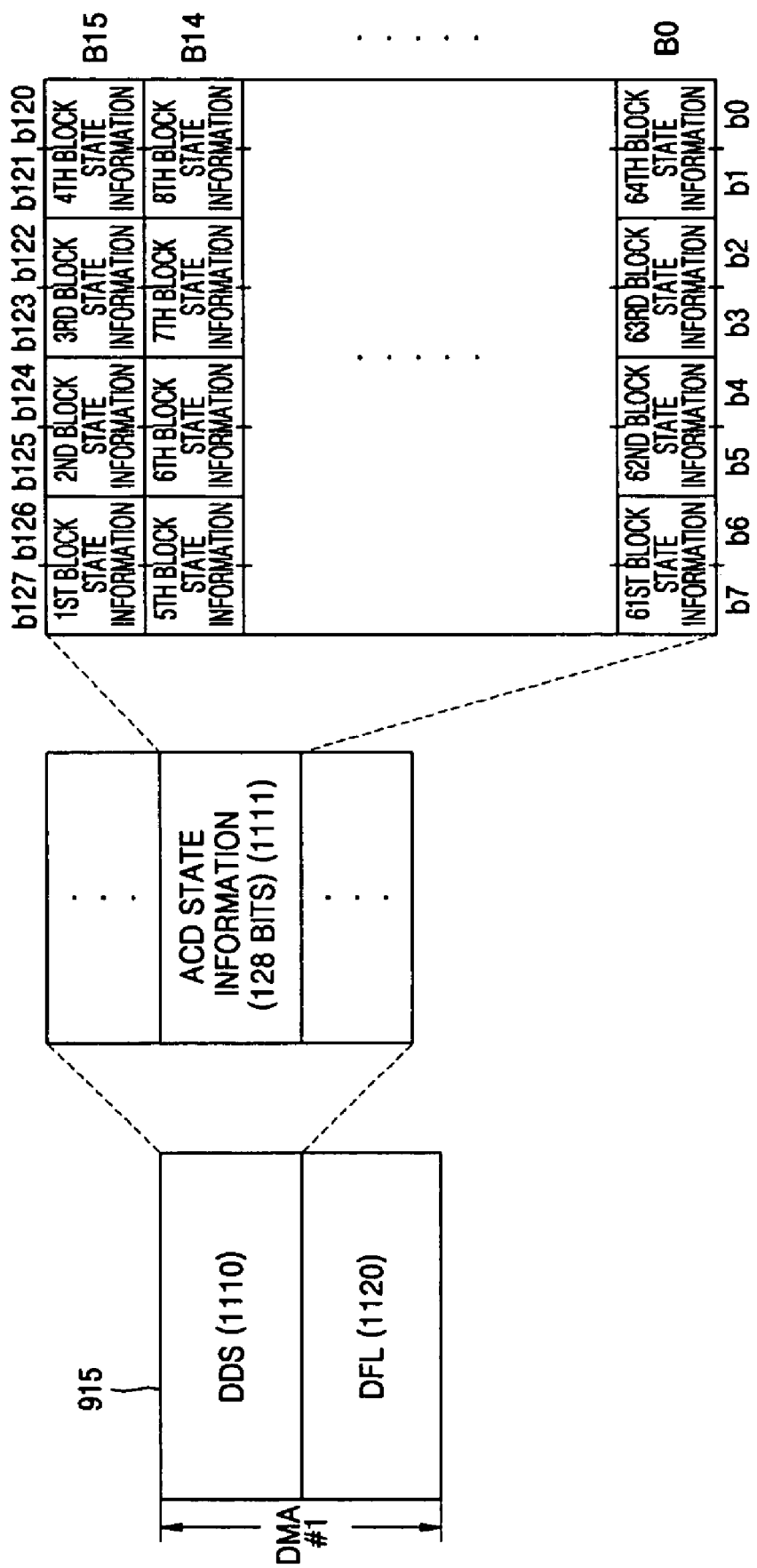
FIG. 11 illustrates a detailed structure of a TDMA provided with an area in which ACD state information is recorded, according to another embodiment of the present invention.

FIG. 11 illustrates a detailed structure of the DMA #1 915 provided with an area in which ACD state information 1111 is recorded, according to another embodiment of the present invention. Referring to FIG. 11, the DMA #1 915 includes the DDS 1110 and the DFL 1120. The DFL 1120 is an area in which information regarding a defect occurring in the UDA 222 (e.g., an address of a defective block and an address of a block replacing the defective block), are recorded for defect management. The DDS 1110 is an area in which disc management information is recorded for disc management. In particular, ACD state information 1111 is recorded in the DDS 1110 according to an embodiment of the present invention.

The ACD state information 1111 contains a state of every ACD block in the ACA 913. Referring to FIG. 11, two bits are assigned for state information regarding a single ACD block. Thus, to record state information regarding 64 blocks defined in the ACA, 64*2=128 bits are assigned to the ACD state information 1111. Accordingly, 16 bytes B0, . . . , B14, B15 are assigned for state information regarding every ACD block in the ACA.

States of ACD blocks on a rewritable recording medium may be expressed in four types as shown in FIG. 5. However, detailed content of the four states may be different. As shown in FIG. 5, a state of each ACD block on the rewritable recording medium is expressed with 2 bits, i.e., "00", "01", "10", or "11" indicating one among the four states. Bits "00" indicate that an ACD block is available for recording ACD. Bits "01" indicate that the ACD block is defective. More specifically, bits "01" indicate that the ACD block is detected as defective while ACD is recorded in the ACA or that the ACD block is a defective block having invalid ACD. Bits "10" indicate that the ACD block has valid ACD but is detected as defective while ACD is reproduced from the ACA. Bits "11" indicate that the ACD block has valid ACD.

When using a rewritable disc, when the ACD recorded at an ACD block in an ACA on the disc is no longer valid, the ACD block is overwritten with a predetermined value (e.g., "00h" or "FFh") and state information (i.e., bits indicating a state of the ACD block) are changed into "00" indicating that the ACD block is available. Here, the ACD block is overwritten with "00h". or "FFh" to prevent the invalid ACD from being reproduced from the ACD block when the state information of the ACD block cannot be read. In other words, to more reliably prevent invalid ACD from being reproduced, an ACD block having the invalid ACD is overwritten with a predetermined value, such as "00h" or "FFh".

During the use of the rewritable disc, when an update of ACD recorded in an ACD block is requested, state information of the ACD block having old ACD is changed into "01"

in a DDS on the rewritable disc to indicate that the ACD block has invalid ACD, and updated ACD is recorded in a subsequent available block in an ACA on the rewritable disc.

Figure 12A:
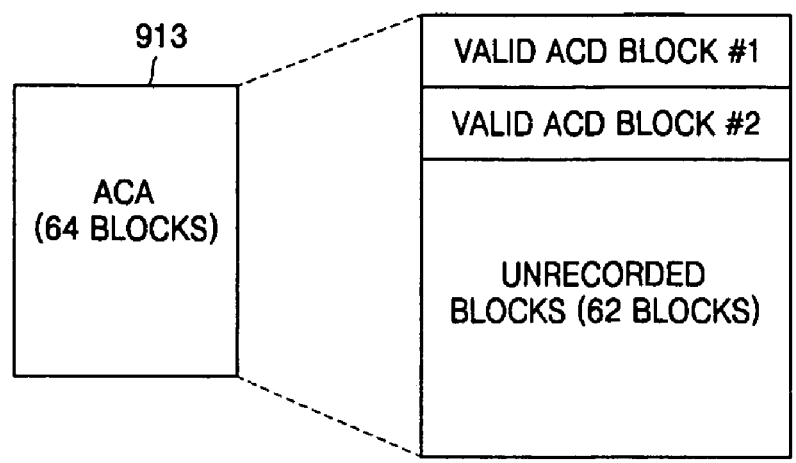
FIG. 12A illustrates an example of states of ACD blocks in the ACA shown in FIG. 9.

Examples of recording state information regarding ACD blocks will be described in detail below with reference to FIGS. 12A through 14B. FIG. 12A illustrates an example of states of ACD blocks in the ACA 913 shown in FIG. 9. Referring to FIG. 12A, the ACA 913 includes 64 blocks includes two ACD blocks #1 and #2 having valid ACD and the other 62 blocks that have no data recorded therein and are available for recording.

Figure 12B:
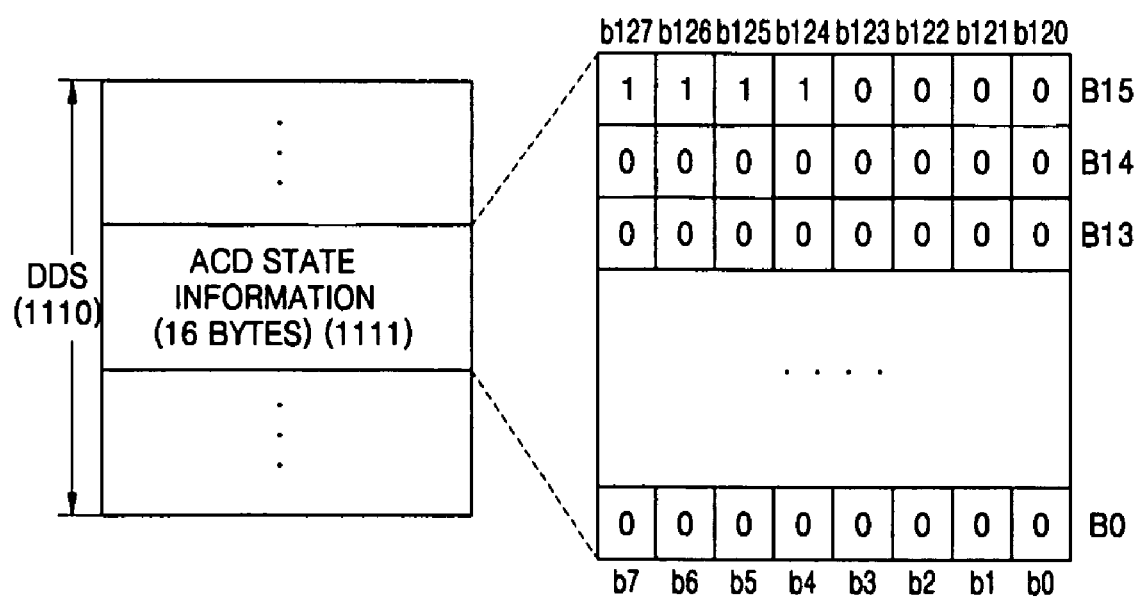
FIG. 12B illustrates an example of ACD state information included in the TDDS in accordance with the states of the ACD blocks shown in FIG. 12A.

FIG. 12B illustrates an example of the ACD state information 1111 included in the DDS 1110 in accordance with the states of the ACD blocks shown in FIG. 12A. Referring to FIG. 12B, the DDS 1110 includes an area with a size of 16 bytes to store the ACD state information 1111 containing state information regarding the 64 blocks included in the ACA 913 shown in FIG. 12A. To indicate that the ACD blocks #1 and #2 have the valid ACD, bits "11" are recorded as state information in positions b127 and b126, and bits "11" are recorded as state information in positions b125 and b124. To indicate that the other 62 blocks have not been used and are available for ACD recording, "0" is recorded in each of positions b123 through b0 so that state information regarding each of the 62 blocks is expressed by bits "00".

Figure 13A:
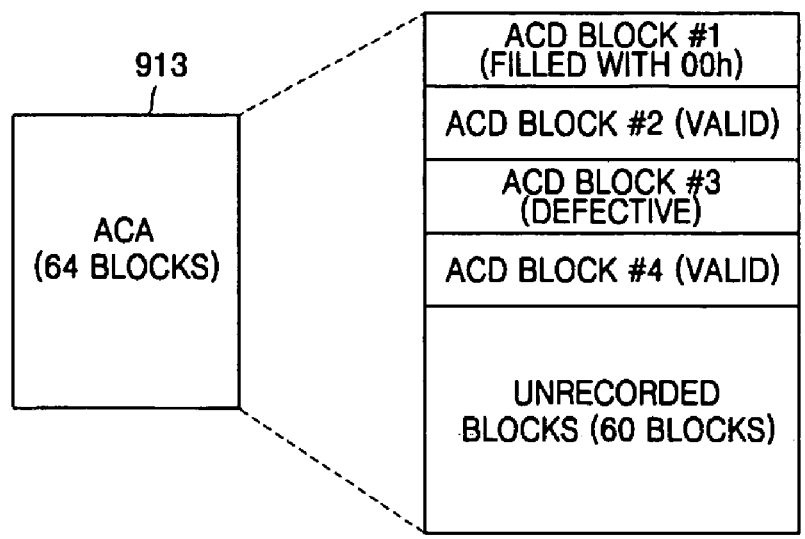
FIG. 13A illustrates an example of states of the ACD blocks in the ACA shown in FIG. 9.
Figure 13B:
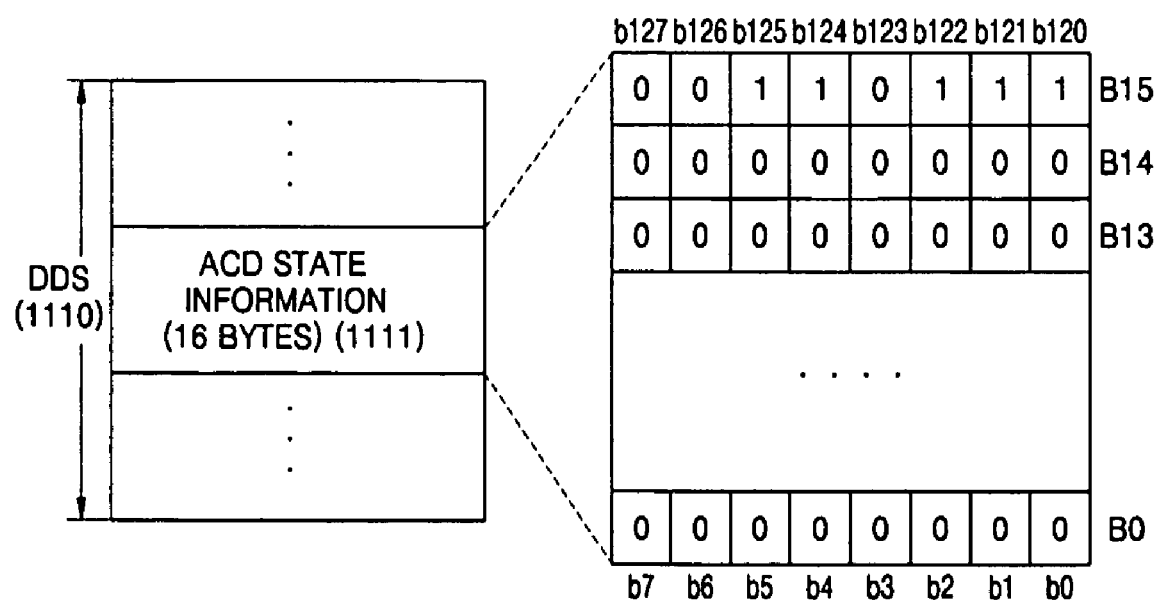
FIG. 13B illustrates an example of ACD state information included in the TDDS in accordance with the states of the ACD blocks shown in FIG. 13A.

FIGS. 13A and 13B illustrate changes in the ACD state information 1111 recorded in the DDS 1110 according to ACD updated and occurrence of a defective block. FIG. 13A illustrates an example of states of the ACD blocks in the ACA 913 shown in FIG. 12A. Referring to FIG. 13A, the ACD block #1 in the ACA 913 shown in FIG. 12A is overwritten with "00h" since the ACD recorded in the ACD block #1 is not necessary any more. In addition, a defect is detected while ACD regarding a new function is written to an ACD block #3 in response to a request or as a result of verification after the writing, and thus the ACD regarding the new function is recorded in a subsequent block, i.e., an ACD block #4. In other words, in the ACA 913, the ACD block #1 is filled with "00h", the ACD block #2 has valid ACD, the ACD block #3 is a defective block, and the ACD block #4 has valid ACD, and the remaining 60 blocks are unrecorded and available.

FIG. 13B illustrates an example of the ACD state information 1111 included in the DDS 1110 in accordance with the states of the ACD blocks shown in FIG. 13A. Referring to FIG. 13B, since the ACD block #1 in the ACA 913 has been overwritten with "00h", bits indicating state information regarding the ACD block #1, at the positions b127 and b126 in the DDS 1110 are changed into "00" to allow the ACD block #1 to be used. Since the ACD block #2 is not changed, bits "11" indicating state information regarding the ACD block #2 remain. The ACD block #3 has been detected as defective during recording or as a result of verification after writing, bits indicating state information regarding the ACD block #3 at positions b123 and b122 in the DDS 1110 are changed into "01". Since the ACD block #4 has the valid ACD regarding the new function, bits indicating state information regarding the ACD block #4 at positions b121 and b120 are changed into "11".

Figure 14A:
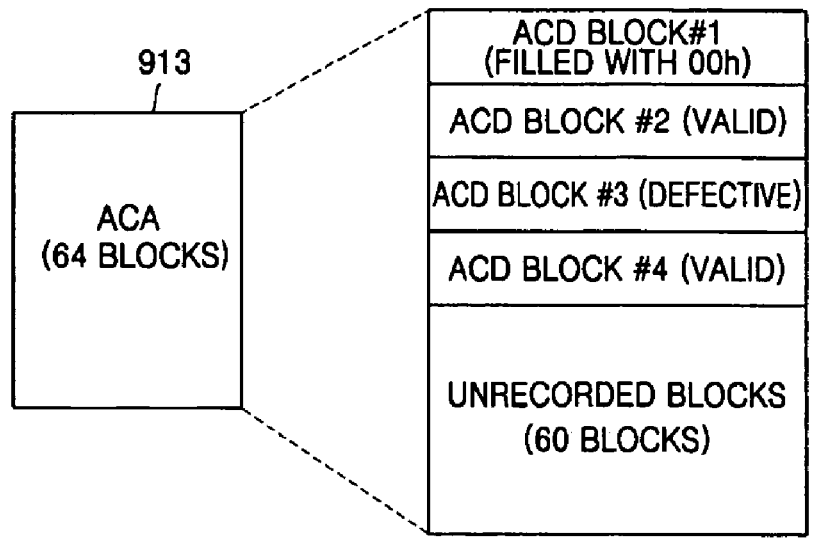
FIG. 14A illustrates an example of states of the ACD blocks in the ACA shown in FIG. 9.
Figure 14B:
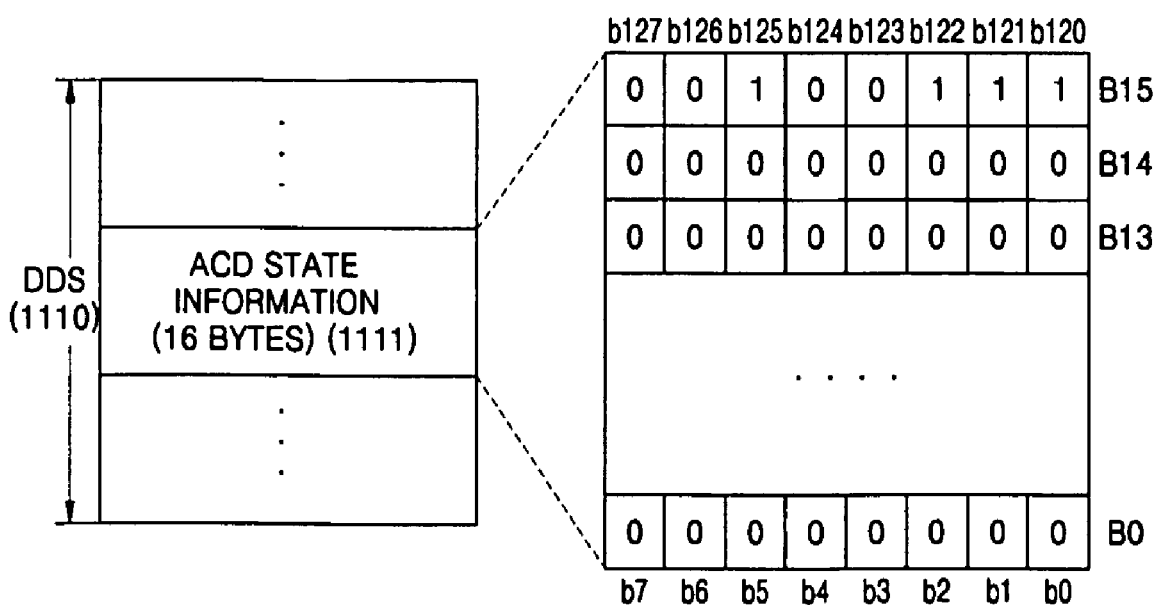
FIG. 14B illustrates an example of ACD state information included in the TDDS in accordance with the states of the ACD blocks shown in FIG. 14A.

FIGS. 14A and 14B illustrate a change in the ACD state information 1111 recorded in the DDS 1110 according to an error occurring while an ACD block is reproduced. FIG. 14A illustrates an example of states of the ACD blocks in the ACA 913 shown in FIG. 9. A rewritable recording medium having a state of the ACA 913 shown in FIG. 13A may be loaded into a drive system, and an error occurring while the valid ACD respectively recorded in the ACD blocks #2 and 4 in the ACA 913 are reproduced based on the ACD state information 1111 included in the DDS 1110 shown in FIG. 13B may not be corrected during the reproduction. Since FIG. 14A illustrates states of the blocks until the error occurs while the ACD recorded in the ACD block #2 is reproduced, the state of the ACA 913 shown in FIG. 14A is the same as that shown in FIG. 13A.

FIG. 14B illustrates an example of the ACD state information 1111 included in the DDS 1110 in accordance with the states of the ACD blocks shown in FIG. 14A. Referring to FIG. 14B, to indicate that the ACD recorded in the ACD block #2 in the ACA 913 on the disc is still valid even though it could not been reproduced, bits at the positions b125 and b124 corresponding to the ACD block #2 in the DDS 1110 are changed into "10", so that the valid ACD recorded in the ACD block #2 can be reproduced by a drive system with higher performance than a current drive system that cannot reproduce the valid ACD recorded in the ACD block #2. If the drive system with the higher performance can reproduce the valid ACD recorded in the ACD block #2, the valid ACD may be moved to another normal block. In this situation, when the disc is loaded into another drive system afterwards, the valid ACD moved from the ACD block #2 to the normal block is reproduced from the normal block not from the ACD block #2, thereby providing convenient use of the disc.

Figure 15:
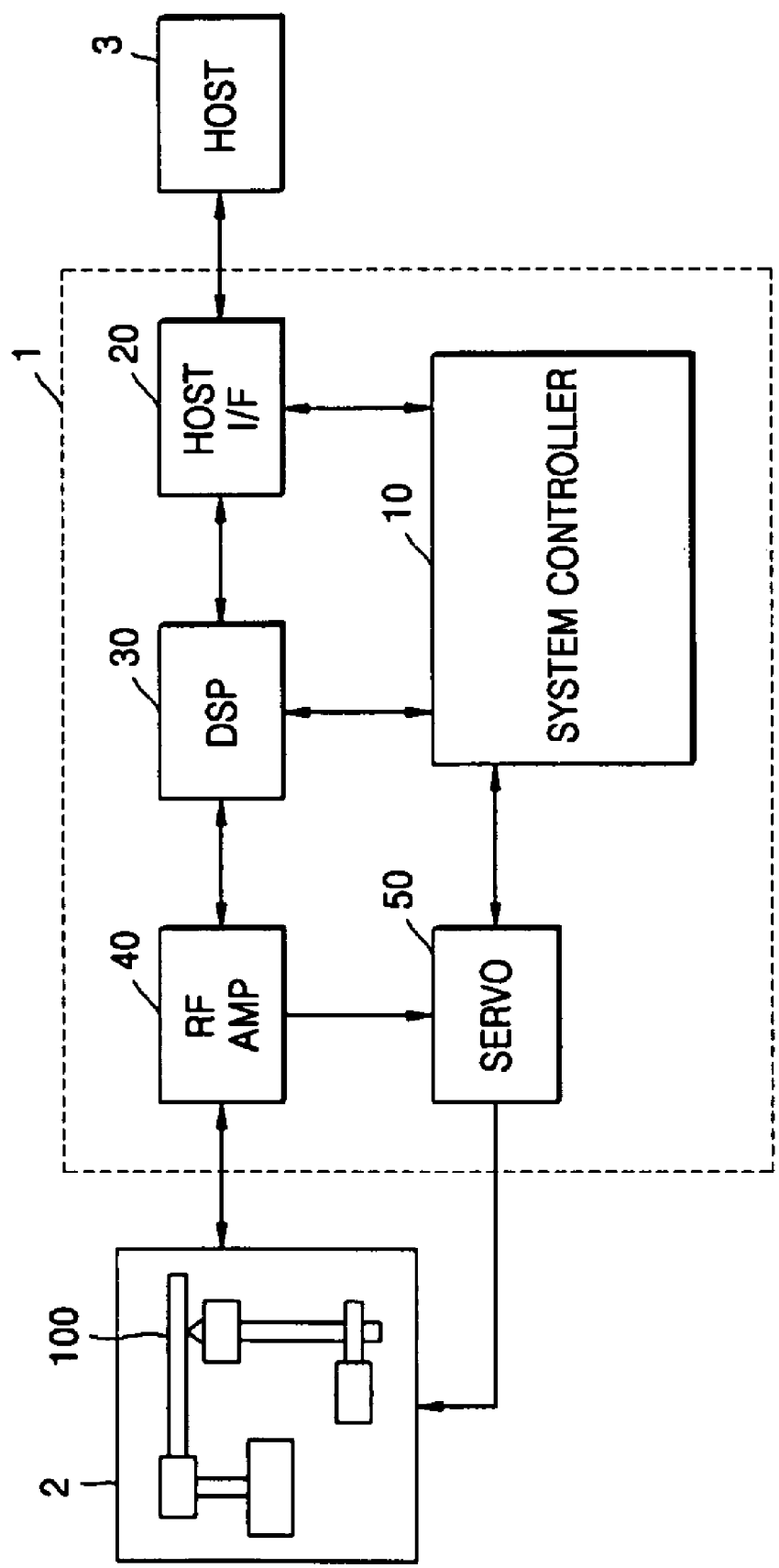
FIG. 15 is a schematic block diagram of a recording/reproducing apparatus according to an embodiment of the present invention.

FIG. 15 is a schematic block diagram of a recording/reproducing apparatus according to an embodiment of the present invention. Referring to FIG. 15, the recording/reproducing apparatus includes a writing/reading unit 2 and a control unit 1.

The writing/reading unit 2 includes a pickup and writes data to and reads data from the disc 100 that is an optical recording medium of the present invention. Here, the disc 100 may be a write-once information recording medium, i.e., the disc 200, or a rewritable recording medium, i.e., the disc 900.

The control unit 1 controls the writing/reading unit 2 to write data to and read data from the disc 100 according to a predetermined file system. More particularly, the control unit 1 assigns an ACD state information area in a DMA included in a lead-in area on the disc 100 to manage a state of each ACD block at which ACD is recorded in an ACA included in the lead-in area, and also performs control to record and manage state information regarding each ACD block in the ACD state information area. The control unit 1 includes a system controller 10, a host interface (I/F) 20, a digital signal processor (DSP) 30, a radio frequency (RF) amplifier (AMP) 40, and a servo 50.

During recording, the host I/F 20 receives a predetermined write command from a host 3 and transmits the command to the system controller 10. The system controller 10 controls the DSP 30 and the servo 50 to execute the write command received from the host I/F 20. The DSP 30 adds additional data, such as a parity, to data received from the host I/F 20 to be written, performs error correction coding (ECC) to generate an ECC block for error correction, and modulates the ECC block in a predetermined mode. The RF AMP 40 converts data output from the DSP 30 into an RF signal. The writing/reading unit 2 including the pickup writes the RF signal received from the RF AMP 40 to the disc 100. The servo 50 receives a servo control command from the system controller 10 and performs servo control on the pickup included in the writing/reading unit 2.

During reproduction, the host I/F 20 receives a read command from the host 3. The system controller 10 performs initialization needed for reproduction. The writing/reading unit 2 radiates a laser beam on the disc 100 and outputs an optical signal obtained from the laser beam reflected from the disc 100. The RF AMP 40 converts the optical signal received from the writing/reading unit 2 into an RF signal, provides modulated data obtained from the RF signal to the DSP 30, and provides a servo signal obtained from the RF signal to the servo 50. The DSP 30 demodulates the modulated data and outputs data obtained by performing ECC on the demodulated data. Meanwhile, the servo 50 receives the servo signal from the RF AMP 40 and the servo control command from the system controller 10 and performs servo control on the pickup. The host I/F 20 transmits the data from the DSP 30 to the host 3. The system controller 10 reads disc management information or defect information from the disc 100 and controls the servo 50 to read data from a position where data has been recorded with no defects on the disc 100. According to aspects of the invention, the recording/reproducing apparatus illustrated in FIG. 15 may be implemented by an individual recording apparatus and an individual reproducing apparatus or by a single recording and reproducing apparatus, and can be implemented as a stand alone apparatus or as part of a computer system.

Figure 16:
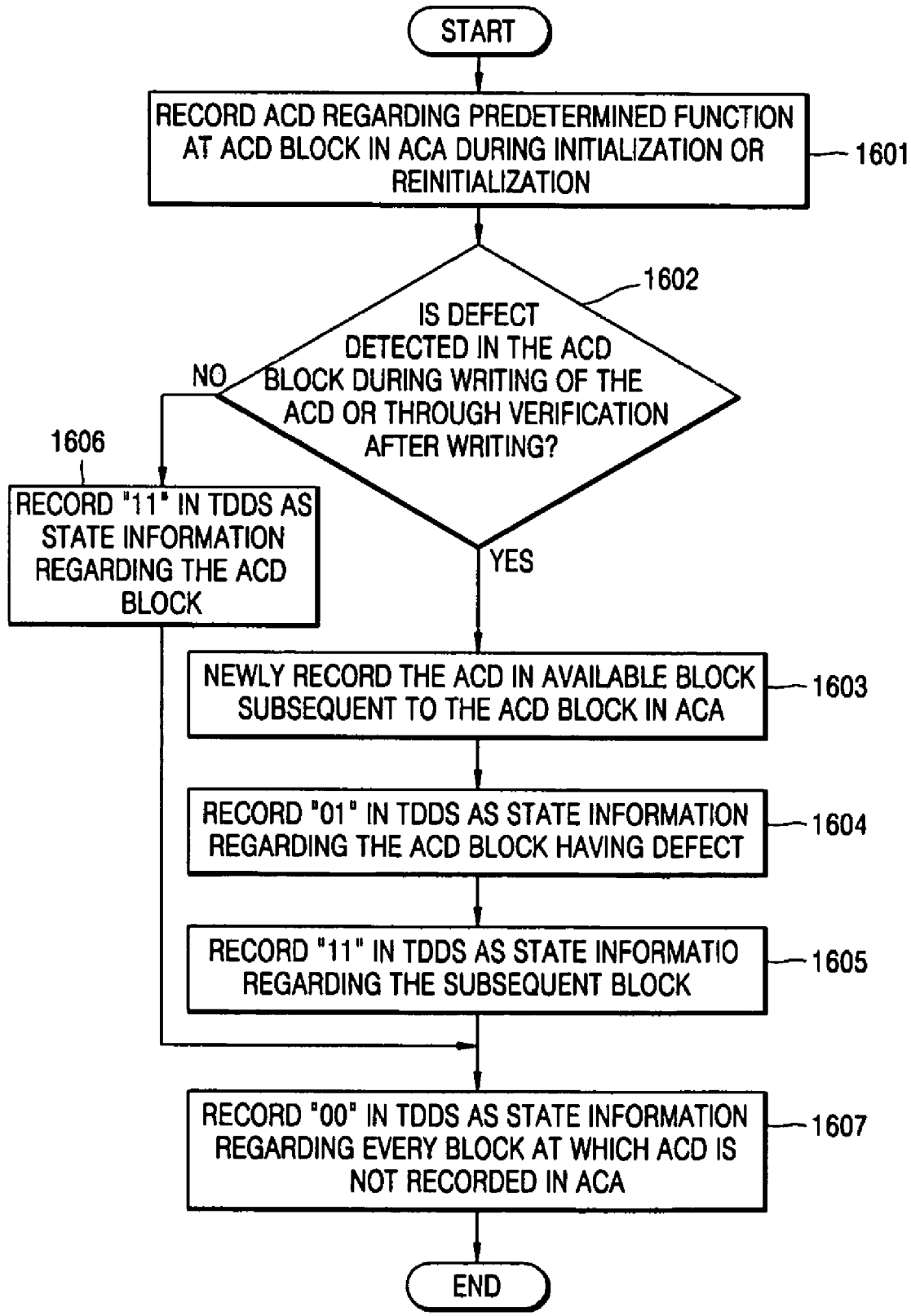
FIG. 16 is a flowchart of a method of recording ACD state information according to an embodiment of the present invention.

Operations of the recording/reproducing apparatus illustrated in FIG. 15 recording and updating ACD state information will be described with reference to FIGS. 16 and 17 below. FIG. 16 is a flowchart of a method of recording ACD state information according to an embodiment of the present invention. In operation 1601, during initialization or reinitialization of the write-once disc 200, the system controller 10 performs control to record ACD regarding a predetermined function at an ACD block in the ACA 213 included in the lead-in area 210 on the disc 200. In operation 1602, the system controller 10 detects during the writing of the ACD or through verification after the writing whether a defect is present in the ACD block. If the defect is present in the ACD block, in operation 1603, the system controller 10 performs control to newly record the ACD in an available block subsequent to the ACD block. In operation 1604, the system controller 10 performs a control operation to record bits "01" in the TDDS 410 as state information regarding the ACD block having the defect. In operation 1605, the system controller 10 performs a control operation to record bits "11" in the TDDS 410 as state information regarding the subsequent ACD block in which the ACD is newly recorded. In operation 1607, the system controller 10 performs a control operation to record bits "00" in the TDDS 410 as state information regarding every block at which ACD is not recorded in the ACA 213.

If it is detected that no defect is present in the ACD block in operation 1602, in operation 1606, the system controller 10 performs a control operation to record bits "11" in the TDDS 410 as state information regarding the ACD block and performs operation 1607.

Although it has been described with reference to FIG. 16 that the operations of recording ACD and recording state information regarding the recording of the ACD are performed during initialization or reinitialization of a disc, these operations are not restricted to the initialization and reinitialization but may be performed to updated ACD or record new ACD even during use of the disc. In addition, the method illustrated in FIG. 16 is also applied to a rewritable recording medium in the same manner, with the exception that state information regarding an ACD block is generally recorded in a DDS instead of a TDDS according to an aspect of the invention.

Figure 17:
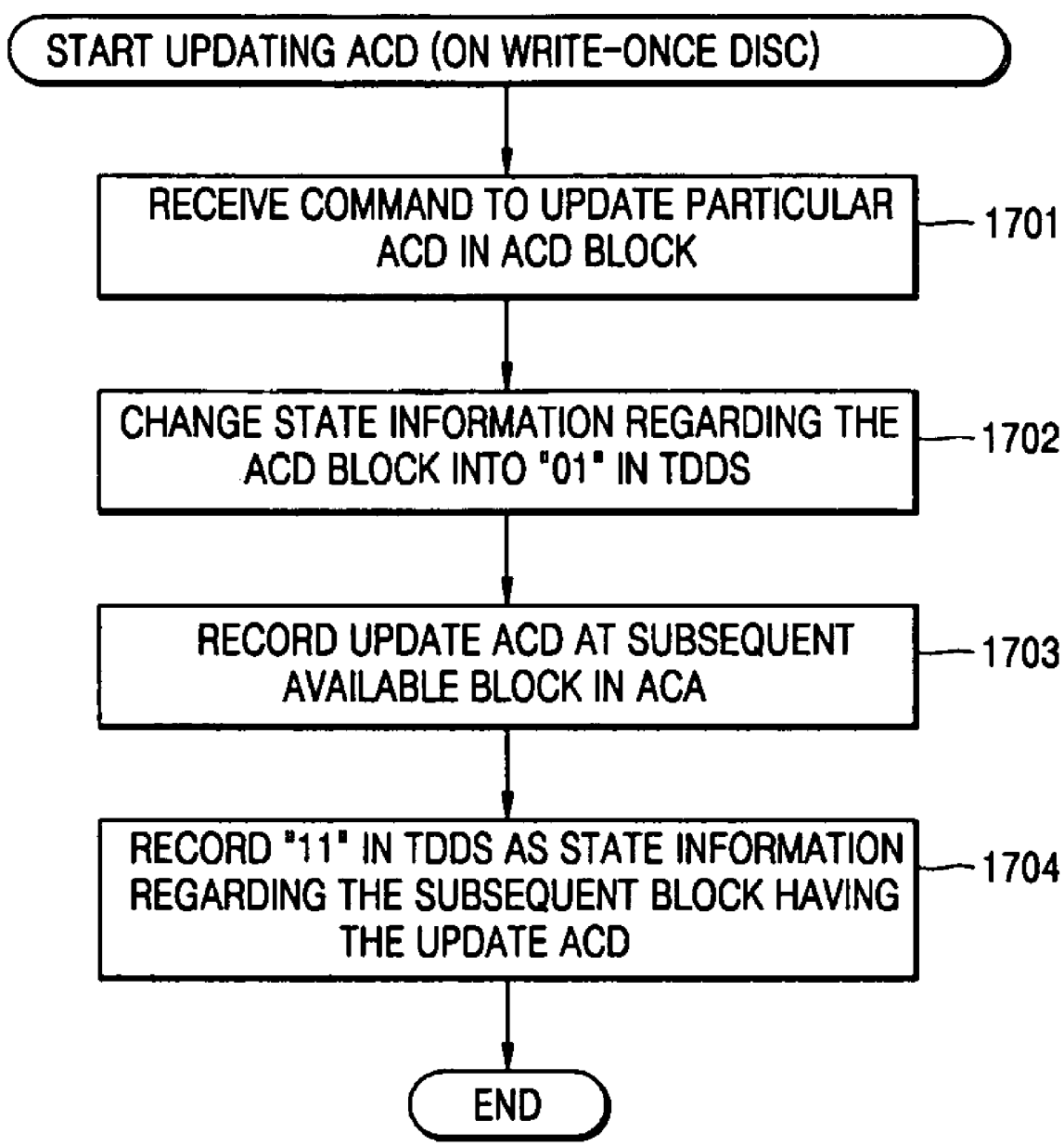
FIG. 17 is a flowchart of a method of recording ACD state information when an ACD block is updated according to an embodiment of the present invention.

FIG. 17 is a flowchart of a method of recording ACD state information when an ACD block is updated according to an embodiment of the present invention. In operation 1701, the system controller 10 receives a command to update particular ACD recorded at an ACD block in an ACA on a write-once disc. Then, in operation 1702, the system controller 10 performs a control operation to change state information regarding the ACD block into bits "01" in a TDDS on the disc to indicate that the ACD block does not have valid ACD.

In operation 1703, the system controller 10 performs a control operation to record updated ACD having the same ID as the particular ACD at a subsequent available block in the ACA on the disc. In operation 1704, the system controller 10 performs a control operation to record bits "11" in the TDDS as state information regarding the subsequent block at which the updated ACD has been recorded.

While not required in all aspects, aspects of the invention can also be embodied as computer readable codes on one or more computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, common information regarding disc access control, which is recognizable by all standards of a drive system, is recorded on a disc so that even a drive system that cannot recognize a function of the disc can properly operate based on the common information, thereby providing compatibility between the disc and the drive system. In addition, the common information can be efficiently managed.

While this invention has been particularly shown and described with reference to embodiments thereof, it will be understood by those skilled in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims and equivalents thereof, and all differences within the scope will be construed as being included in the present invention.

What is claimed is:

1. An information recording medium for use with a recording and/or reproducing apparatus, the medium comprising:
    an access control area including a plurality of access control data (ACD) blocks, at least one of the plurality of access control data blocks comprising ACD having access control information for a recording and/or reproducing apparatus which cannot recognize a predetermined function included in the ACD of the ACD block;
    a temporary defect management area comprising a temporary disc definition structure including state information for each of the plurality of ACD blocks, the state information indicating whether the ACD block is unrecorded and whether the ACD block comprises valid ACD or invalid ACD; and
    a defect management area comprising a disc definition structure which is a copy of the temporary disc definition structure which is lastly recorded in the temporary defect management area.

2. The information recording medium of claim 1, wherein the state information comprises a second defective state that indicates to the apparatus that the ACD block has valid ACD but is detected as defective while the valid ACD is reproduced from the ACD block.

3. The information recording medium of claim 1, wherein the state information comprises a third defective state selectable between and indicating one of a state that the ACD block is detected as defective while the ACD is recorded in the ACD block and a state that the ACD block has invalid ACD.

4. A recording/reproducing apparatus which transfers data with respect to an information recording medium, the apparatus comprising:
   a writing/reading unit writing data to or reading data from the information recording medium having an access control area including a plurality of access control data (ACD) blocks, at least one of the plurality of ACD blocks comprising ACD having access control information for a recording and/or reproducing apparatus which cannot recognize a predetermined function included in the ACD of the ACD block; and
   a control unit controlling the writing/reading unit
      to record a temporary disc definition structure including state information for each of the plurality of ACD blocks in a temporary defect management area, the state information indicating whether the ACD block is unrecorded and whether the ACD block comprises valid ACD or invalid ACD; and
      to record a disc definition structure in a defect management area, the disc definition structure being a copy of the temporary disc definition structure which is lastly recorded in the temporary defect management area.

5. The recording/reproducing apparatus of claim 4, wherein, when the information recording medium is a write-once information recording medium:
   the state information comprises a defective state indicating that the ACD block is a defective block, and
   the defective state is one selectable between and indicating at least one of a state that the ACD block is detected as defective while the ACD is recorded in the ACD block, a state that the ACD block has invalid ACD, a state that the ACD block has old and invalid ACD and updated ACD has been recorded in another ACD block, a state that the ACD block is an unrecorded block filled with predetermined data according to finalization of the information recording medium.

6. The recording/reproducing apparatus of claim 4, wherein, when the information recording medium is a write-once information recording medium, the state information comprises a state that the ACD block has valid ACD but is detected as defective while the valid ACD is reproduced from the ACD block.

7. The recording/reproducing apparatus of claim 5, wherein, when the ACD recorded in the ACD block is updated, the control unit controls the writing/reading unit to change the state information regarding the ACD block into the defective state indicating that the ACD block has invalid ACD and to record updated ACD in a subsequent available ACD block in the access control area.

8. The recording/reproducing apparatus of claim 4, wherein, when the information recording medium is a rewritable information recording medium, the state information comprises:
   a defective state indicating that the ACD block is a defective block, and
   the defective state is one selectable between and indicating at least one of a state that the ACD block is detected as defective while the ACD is recorded in the ACD block, a state that the ACD block has invalid ACD, and a state that the ACD block has valid ACD but is detected as defective while the valid ACD is reproduced from the ACD block.

9. The recording/reproducing apparatus of claim 8, wherein, when the ACD recorded in the ACD block is no longer valid, the control unit controls the writing/reading unit to overwrite the ACD block with a predetermined value and to change the state information regarding the ACD block into a state indicating that the ACD block is available to allow other ACD to be recorded in the ACD block.

10. The recording/reproducing apparatus of claim 4, wherein, when the ACD block in the access control area is detected as defective while the ACD is written to the ACD block or as a result of verification of the writing, the control unit controls the writing/reading unit to record the ACD in a subsequent ACD block in the access control area.

11. The recording/reproducing apparatus of claim 4, wherein:
   the information storage medium further includes a defect management area having a disc definition structure an the access control area comprises 64 locations to record up to 64 ACD blocks, and
   the control unit assigns two bits for state information regarding each corresponding ACD block and assigns 16 bytes to the disc definition structure in the defect management area to record state information regarding each of the 64 ACD blocks included in the access control area.

12. A recording/reproducing apparatus which transfers data with respect to an information recording medium, the apparatus comprising:
   a writing/reading unit to write data to or to read data from the information recording medium, the information recording medium having an access control area including a plurality of access control data blocks, at least one of the plurality of access control data blocks comprising access control data having access control information for a recording and/or reproducing apparatus which cannot recognize a predetermined function included in the access control data of the access control data block; and
   a control unit controlling the writing/reading unit to read a temporary disc definition structure including state information for each of the plurality of access control data blocks, from a temporary defect management area, the state information indicating whether the access control data block is unrecorded and whether the access control data block comprises valid access control data or invalid access control data,
   wherein the information recording medium further comprises a defect management area comprising a disc definition structure which is a copy of the temporary disc definition structure which is lastly recorded in the temporary defect management area.

* * * * *

UNITED STATES PATENT AND TRADEMARK OFFICE
CERTIFICATE OF CORRECTION

PATENT NO. : 7,663,990 B2  Page 1 of 1
APPLICATION NO. : 11/062669
DATED : February 16, 2010
INVENTOR(S) : Hwang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1369 days.

Signed and Sealed this

Twenty-eighth Day of December, 2010

David J. Kappos
*Director of the United States Patent and Trademark Office*